United States Patent
Sakurai et al.

(10) Patent No.: US 7,621,448 B2
(45) Date of Patent: Nov. 24, 2009

(54) INFORMATION DISPLAY MEDIUM, INFORMATION MANAGING APPARATUS, INFORMATION MANAGING METHOD, GUIDANCE MANAGING METHOD, AND GUIDANCE MANAGING PROGRAM

(75) Inventors: Hideo Sakurai, Shizuoka (JP); Atsushi Kutami, Shizuoka (JP); Tetsuo Noji, Shizuoka (JP); Yoshihiro Sugiyama, Shizuoka (JP); Junpei Sakae, Shizuoka (JP); Yoshiaki Nishizaki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 437 days.

(21) Appl. No.: 11/235,418

(22) Filed: Sep. 27, 2005

(65) Prior Publication Data

US 2006/0081696 A1 Apr. 20, 2006

(30) Foreign Application Priority Data

| Sep. 30, 2004 | (JP) | ............................ 2004-286582 |
| Sep. 30, 2004 | (JP) | ............................ 2004-289025 |
| Oct. 8, 2004 | (JP) | ............................ 2004-295953 |
| Sep. 13, 2005 | (JP) | ............................ 2005-265445 |

(51) Int. Cl.
  *G06F 17/60* (2006.01)
(52) U.S. Cl. .................... 235/385; 340/10.52
(58) Field of Classification Search ................ 235/385, 235/380, 454, 460; 340/10.51–10.52, 539.13
See application file for complete search history.

(56) References Cited

U.S. PATENT DOCUMENTS

2004/0194133 A1* 9/2004 Ikeda et al. ................... 725/37

2005/0099292 A1* 5/2005 Sajkowsky ............. 340/539.13

FOREIGN PATENT DOCUMENTS

| JP | 10-240880 | 9/1998 |
| JP | 11-301843 | 11/1999 |
| JP | 2000-308691 | 11/2000 |
| JP | 2001-237627 | 8/2001 |
| JP | 2002-070455 | 3/2002 |

(Continued)

OTHER PUBLICATIONS

Uko (JP 2002255346 A) English Translation, Pub: Sep. 11, 2002.*

*Primary Examiner*—Daniel St. Cyr
(74) *Attorney, Agent, or Firm*—Oblon, Spivak, McClelland, Maier & Neustadt, L.L.P.

(57) ABSTRACT

An information managing apparatus for managing an information display medium is disclosed that includes a reversible display unit that is configured to reversibly display information in visible form and a reversible display storage unit that is configured to store display content data corresponding to the information displayed at the reversible display unit. The apparatus further includes a scanner unit that is configured to read a display of the reversible display unit and acquire display read data of the read display; a reader unit that is configured to acquire first display content data stored in the reversible display storage unit; and a control unit that is configured to compare the display read data acquired by the scanner unit and the first display content data acquired by the reader unit, extract a difference between the display read data and the first display content data based on the comparison, and output the extracted difference.

20 Claims, 25 Drawing Sheets

FOREIGN PATENT DOCUMENTS

| | | |
|---|---|---|
| JP | 2002-73138 | 3/2002 |
| JP | 2002-245418 | 8/2002 |
| JP | 2002-257560 | 9/2002 |
| JP | 2002-279362 | 9/2002 |
| JP | 2002255346 A * | 9/2002 |
| JP | 2004-86848 | 3/2004 |
| JP | 2004-258699 | 9/2004 |
| JP | 2004-295401 | 10/2004 |
| JP | 2004-295402 | 10/2004 |

\* cited by examiner

--Related Art--

--Related Art--

INFORMATION DISPLAY MEDIUM, INFORMATION MANAGING APPARATUS, INFORMATION MANAGING METHOD, GUIDANCE MANAGING METHOD, AND GUIDANCE MANAGING PROGRAM

BACKGROUND OF THE INVENTION

1. Field of the Invention

The present invention relates generally to an information display medium, an information managing apparatus, and an information managing method that are used in information communication, and particularly to a technique for visually printing information on various types of recording media including forms and cards.

The present invention also relates to a guidance managing method, a guidance managing program, and an information display medium for providing guidance information to a user.

2. Description of the Related Art

In factories, various forms are used for managing various processes. For example, FIG. 1 illustrates a shipment process for shipping products. As is shown in FIG. 1, first a person in charge of shipment prints out a shipment form (step SH1). This shipment form includes a list of products. Then, the person in charge of shipment inspects products to be shipped (step SH2). Specifically, the person in charge of shipment compares the list of products and the actual products to be shipped. Then, the person in charge of shipment inputs the inspection result (comparison result) to a computer terminal to register the inspection result (step SH3). Then, the person in charge of shipment ships the inspected products (step SH4).

It is noted that in conventional practice, when information such as production management information is changed, the updated information has to be printed on a new shipment form. In other words, the shipment form cannot be reused. In response to such an inconvenience, a technique is disclosed in Japanese Laid-Open Patent Publication No. 2002-73138 that relates to a production management system used for managing a process such as a shipment process, the system being capable of efficiently realizing production management using a production management form that may be reused even when the production management information is changed. The disclosed system includes digital paper that is used as the production management form in order to enable rewriting of information as is necessary or desired, an information processing apparatus for processing information pertaining to product management, and communication means for establishing communication between the digital paper and the information processing apparatus. The digital paper may be provided at a predetermined production plant, for example.

In Japanese Patent Laid-Open Publication No. 2004-258699, a technique is disclosed that relates to an information recording medium printing system for visually printing information on a card-type recording medium that stores electronic information. According to the disclosed technique, the information recording medium has a recording medium base material including a rewritable area in which changeable information including at least one image as visual information may be rewritten and a storage area for storing electronic information. The rewritable area of the information recording medium includes an area for printing image information corresponding to usage history or a picture of the owner of the card-type recording medium, and an area for printing individual information of the owner and a corresponding image thereof. The rewritable area may be rewritten through thermal wax transfer printing according to the picture and updating information prepared by the owner.

According to the disclosed techniques, an electronic apparatus such as an information processing apparatus or a printer is required for changing the contents (information) indicated on the recording medium. However, since shipping and handling may be performed in various environments, such an electronic apparatus may not necessarily be readily available to the person performing the shipment process. In such a case, it may be more efficient to write down the inspection result manually on the shipment form. It is desired that even in such a case, the inspection result be preserved as process management data for posterior use.

Also, in a case where another person performing a next process uses the shipment form, it may be difficult for this person to read the information written in this shipment form if the shipment form were passed down in its original handwritten state. Accordingly, means for accurately conveying information in such a case is desired.

In process management, it is important to pass down information in an accurate and efficient manner.

Also, in consideration of the increasing awareness in environmental issues and the campaign calling for zero-garbage/recycling not only within factories but on a global scale, technology for realizing information management that can answer to such circumstance is demanded.

In the field of guidance management, for example, a navigation apparatus installed in an automobile uses the GPS (Global Positioning System) to indicate a position of the automobile on a map displayed on a liquid crystal display apparatus. In such a liquid crystal display apparatus, special equipment is required. Also, there is a size limit to the display of the liquid crystal display apparatus. Therefore, the route to a destination has to be displayed in reduced scale, and in some cases, the route can only be partially displayed on the display apparatus.

In response to such a problem, a technique is disclosed in Japanese Laid-Open Patent Publication No. 2002-257560 that relates to a navigation apparatus that is capable of outputting a map on paper in order to facilitate understanding of a route. According to the disclosed technique, a car navigation system that provides map information service includes an advertisement information service apparatus made up of a host computer that is configured to provide advertisement information service to plural navigation apparatuses via a network and an advertisement information server, and a navigation apparatus having operations means, map information storing means, and printing means. In this system, when a print command for printing of map information meeting designated conditions is issued by the operations means of the navigation apparatus, the navigation apparatus requests the advertisement information service apparatus to transmit advertisement information, receives the requested advertisement information transmitted from the advertisement information service apparatus, and prints out the received advertisement information and the map information by the printing means. In this way, guidance information that is printed out on paper may be provided to a user.

FIG. 7 illustrates another example of managing steps of a process in a factory using a management form. In the illustrated example of FIG. 7, a reception process is performed at a factory reception upon unloading products transported into the factory. Then, the transporting vehicle is guided to a warehouse (i.e., warehouse A, B, or C). Then, the transporting vehicle unloads the transported products at a designated unloading location of the warehouse (e.g., deck A1, A2, or A3 in the case of warehouse A). In cases such as the present example, a special guidance system is desired that is adapted for an environment in which a normal navigation system cannot be used.

In this regard, a technique is disclosed in Japanese Laid-Open Patent Publication No. 2004-86848 relating to a method for aiding access to a searched item (e.g., book) under such a special environment. According to the disclosed technique, a first point corresponding to a starting point within the factory site that is determined beforehand (e.g., entrance of the site), and a second point corresponding to a destination point (e.g., point where the searched book is situated) are input. Then, a path of nodes and routes for reaching the second point from the first point is calculated based on the input information. Then, information is gathered for generating a guidance screen corresponding to a combination of a map screen indicating the calculated path within a screen representing the factory site and an attribute screen indicating attribute information of the nodes and routes of the calculated path according to the path order, after which the guidance screen is generated based on the gathered information and displayed at a terminal of a user.

With the development and growing trend toward joint transportation, a delivery area or district may possibly be changed or modified due to integration of transportation services/operations. Also, owing to referral systems providing reference to transportation service agents (carriers) via the Internet, there may be an increasing number of instances in which a new carrier carries in goods to a factory warehouse. In such cases, persons in charge of carrying in the goods may not be familiar with the factory site, and as a result, time may be unnecessarily consumed in carrying in the goods. Also, it is noted that there are companies that regard lines, structures, and carry-in conditions within their factories as a part of manufacturing processes for manufacturing products that are confidential. In factories and warehouses of such companies, tight security measures have to be implemented with respect to goods being carried in and persons carrying in the goods.

Further, with regard to environmental issues and the promotion of the zero-garbage/recycling campaign, printing guidance information on paper for each carrier results in undesirable waste of paper resources. Accordingly, a transportation/delivery system in consideration of such a situation is desired.

It is noted that in the techniques described above, an information processing apparatus or a printer is required for making changes to display contents.

In product shipment and delivery management, processes are desirably executed in an efficient manner according to the progress of each process. In this regard, a carry-in method that can accommodate to various carriers and various conditions in which goods are carried, and also takes into account environmental issues is desired.

SUMMARY OF THE INVENTION

The present invention has been conceived in response to one or more of the above problems and it provides an information display medium, an information managing method, and an information managing apparatus for enabling a user to perform steps of a process in an efficient manner and ensuring accuracy in conveying information.

Also, the present invention provides a guidance method, a guidance program, and an information display medium for providing guidance information to accurately guide a user.

According to an aspect of the present invention, an information display medium is provided that includes:

a reversible display unit that is configured to reversibly display first information in visible form and directly record and display second information; and a reversible display storage unit that is configured to store content data corresponding to the first information and the second information displayed at the reversible display unit.

According to another aspect of the present invention, an information managing apparatus for managing an information display medium is provided that includes a reversible display unit that is configured to reversibly display information in visible form and a reversible display storage unit that is configured to store display content data corresponding to the information displayed at the reversible display unit. The apparatus includes:

a scanner unit that is configured to read a display of the reversible display unit and acquire display read data of the read display;

a reader unit that is configured to acquire first display content data stored in the reversible display storage unit; and a control unit that is configured to compare the display read data acquired by the scanner unit and the first display content data acquired by the reader unit, extract a difference between the display read data and the first display content data based on the comparison, and output the extracted difference.

According to another aspect of the present invention, an information managing method for managing an information display medium using an information managing apparatus is provided which information display medium includes a reversible display unit for reversibly displaying information in visible form, and a reversible display storage unit for storing display content data corresponding to the information displayed at the reversible display unit, the method including the steps of:

displaying a form including at least one check item at the reversible display unit of the information display medium;

storing first display content data corresponding to the displayed form in the reversible display storage unit of the information display medium;

reading a display of the form having a check result inscribed in the check item and acquiring display read data corresponding to the read display;

acquiring the first display content data from the reversible display storage unit; and comparing the display read data and the first display content data, extracting a difference between the display read data and the first display content data based on the comparison, and outputting the extracted difference.

According to another aspect of the present invention, a guide managing method for managing guidance for a user is provided, the method using a management computer connected to a node terminal stationed at a node, an action schedule storage unit storing action schedule data pertaining to the user, a guidance data storage unit storing guidance data for guiding the user to a next destination node, the node terminal including a reversible print processing unit for performing a reversible print process on a reversible display unit of an information display medium, which includes the reversible display unit for reversibly displaying information in visible form and a data storage unit, and a transmission/reception unit for performing data transmission/reception with the data storage unit of the information display medium. The method includes:

a node determining step for acquiring action determining data stored in the data storage unit of the information display medium via the node terminal, and determining the next destination node for the user based on the acquired action determining data and the action schedule data stored in the action schedule storage unit;

an acquisition step for acquiring the guidance data for guiding the user to the next destination node from the guidance data storage unit; and an outputting step for outputting the acquired guidance data to the information display medium via the node terminal and controlling the reversible display unit of the information display medium to display information corresponding to the acquired guidance data.

According to another aspect of the present invention, a guidance managing program for managing guidance for a user is provided which program is run on a management computer that is connected to a node terminal stationed at a node, an action schedule storage unit storing action schedule data pertaining to the user, a guidance data storage unit storing guidance data for guiding the user to a next destination node, the node terminal including a reversible print processing unit for performing a reversible print process on a reversible display unit of an information display medium including the reversible display unit for reversibly displaying information in visible form and a data storage unit, and a transmission/reception unit for performing data transmission/reception with the data storage unit of the information display medium, the program being executed by the management computer to perform:

a node determining step for acquiring action determining data stored in the data storage unit of the information display medium via the node terminal, and determining the next destination node for the user based on the acquired action determining data and the action schedule data stored in the action schedule storage unit;

an acquisition step for acquiring the guidance data for guiding the user to the next destination node from the guidance data storage unit; and an outputting step for outputting the acquired guidance data to the information display medium via the node terminal and controlling the reversible display unit of the information display medium to display information corresponding to the acquired guidance data.

According to another aspect of the present invention, an information display medium is provided that includes:

a data storage unit storing action determining data for identifying an action; and a reversible display unit that reversibly displays guidance information for providing guidance to a guidance destination that is identified based on the action determining data stored in the data storage unit.

DESCRIPTION OF THE PREFERRED EMBODIMENTS

In the following, preferred embodiments of the present invention are described with reference to the accompanying drawings.

[Information Display Medium, Information Managing Apparatus, and Information Managing Method]

Figure 1:
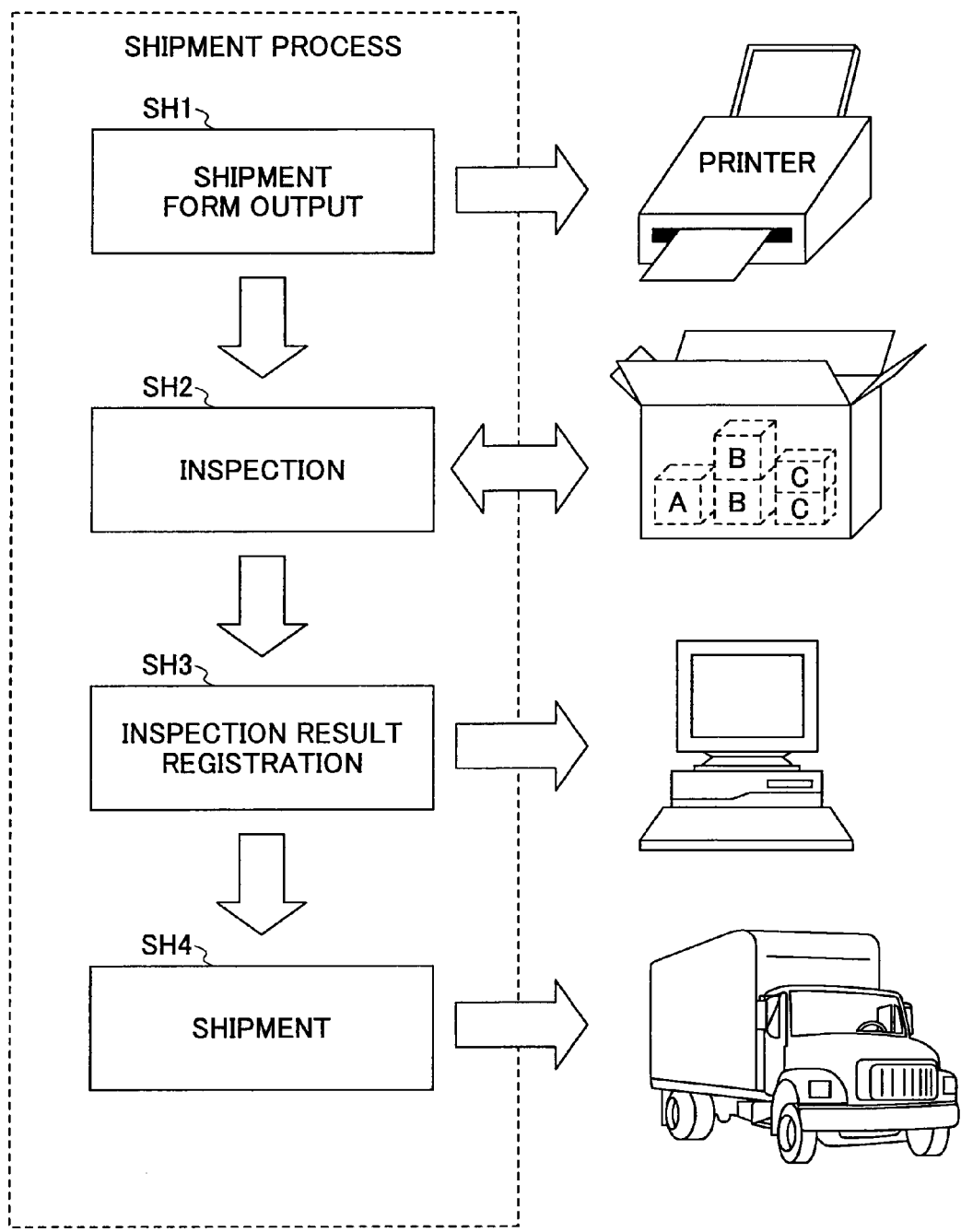
FIG. 1 is a diagram illustrating a shipment process.
Figure 2:
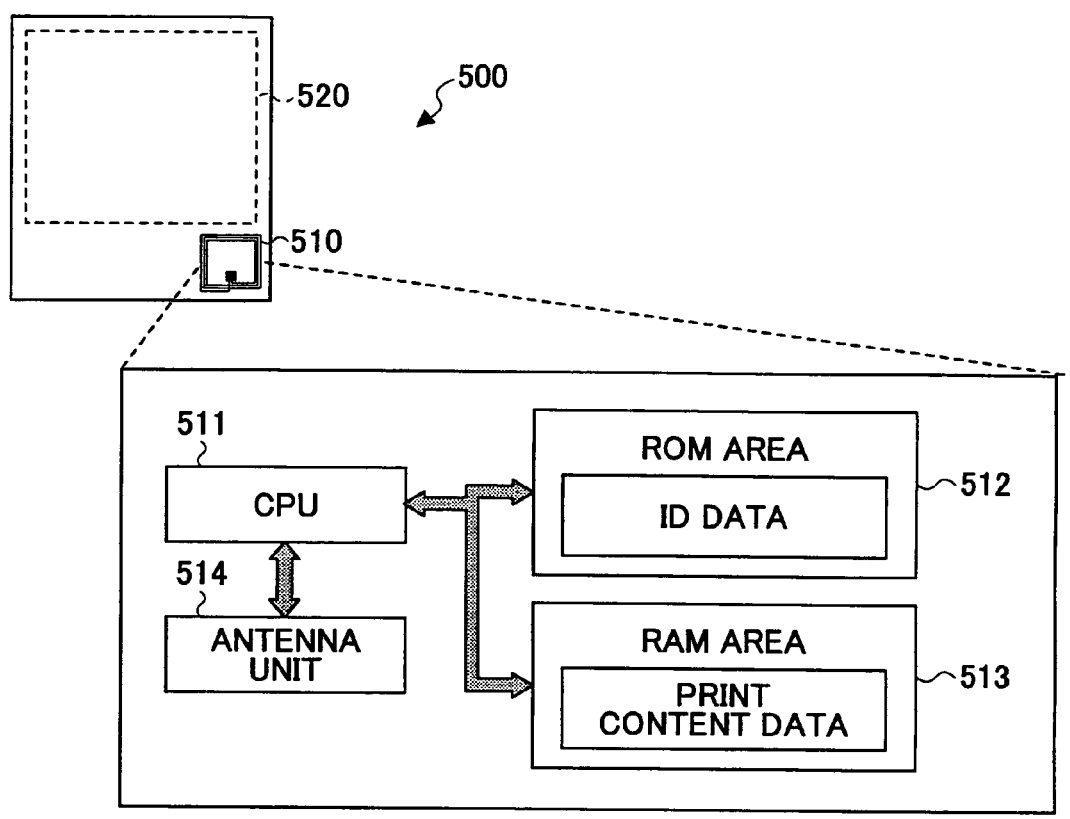
FIG. 2 is a diagram illustrating a configuration of rewritable paper including an IC tag according to an embodiment of the present invention.

First, referring to FIGS. 2 through 5, specific embodiments of an information display medium, an information managing apparatus, and an information managing method employed in a case where a shipment form is used for inspecting products and/or other articles upon their shipment. According to an embodiment, a rewritable paper 500 as is shown in FIG. 2 is used as the information display medium. The rewritable paper 500 may be in A4 size, for example, and a portion of the rewritable paper 500 corresponds to a rewritable display area 520 that functions as a rewritable reversible display unit.

The rewritable display area 520 includes a reversible thermo-sensitive recording medium such as a thermo-chromic film. According to an embodiment, the thermo chromic film includes leuco dye and a developer in its recording layer to realize rewritable characteristics. In this case, color formation is realized by heating the rewritable display area 520 in a non-colored state to a melting point of the leuco dye and the developer (e.g., approximately 180° C.) to cause interfusion of the dye and the developer, and then rapidly cooling the interfused leuco dye and developer. In this way, the dye and the developer may be solidified in a combined state, and the color formation may be stabilized by realizing a relatively regular condensation state. On the other hand, color erasure is realized by reheating the rewritable display area 520 to a temperature that does not cause melting of the colored state of the rewritable display area 520 (e.g., 120-160° C.). In this case, the condensation state of the color formation is destructed, and only the developer crystallizes to thereby cause phase separation so that color erasure may be realized.

The rewritable paper 500 according to the present embodiment includes four layers; namely, a protective layer, a recording layer made of a thermo-chromic film, a base material layer, and a back coat layer, that are arranged in this order in a depth direction with respect to the upper surface side. The rewritable paper 500 is provided with flexibility as well as a sufficient level of durability so that it may be repetitively used.

Also, as is shown in FIG. 2, the rewritable paper 500 includes an IC tag 510. The IC tag 510 includes a CPU 511, a ROM area 512, a RAM area 513, and an antenna unit 514. The ROM area stores identification information for identifying the rewritable paper 500 (i.e., ID data of this IC tag in the illustrated example). The RAM area 513 functions as a reversible display storage unit that stores print data corresponding to display content data of contents displayed in the rewritable display area 520. The antenna unit 514 includes an antenna coil and is configured to realize non-contact data transmission/reception with a printer 40 (see FIG. 3) corresponding to an information managing apparatus according to an embodiment of the present invention.

Figure 3:
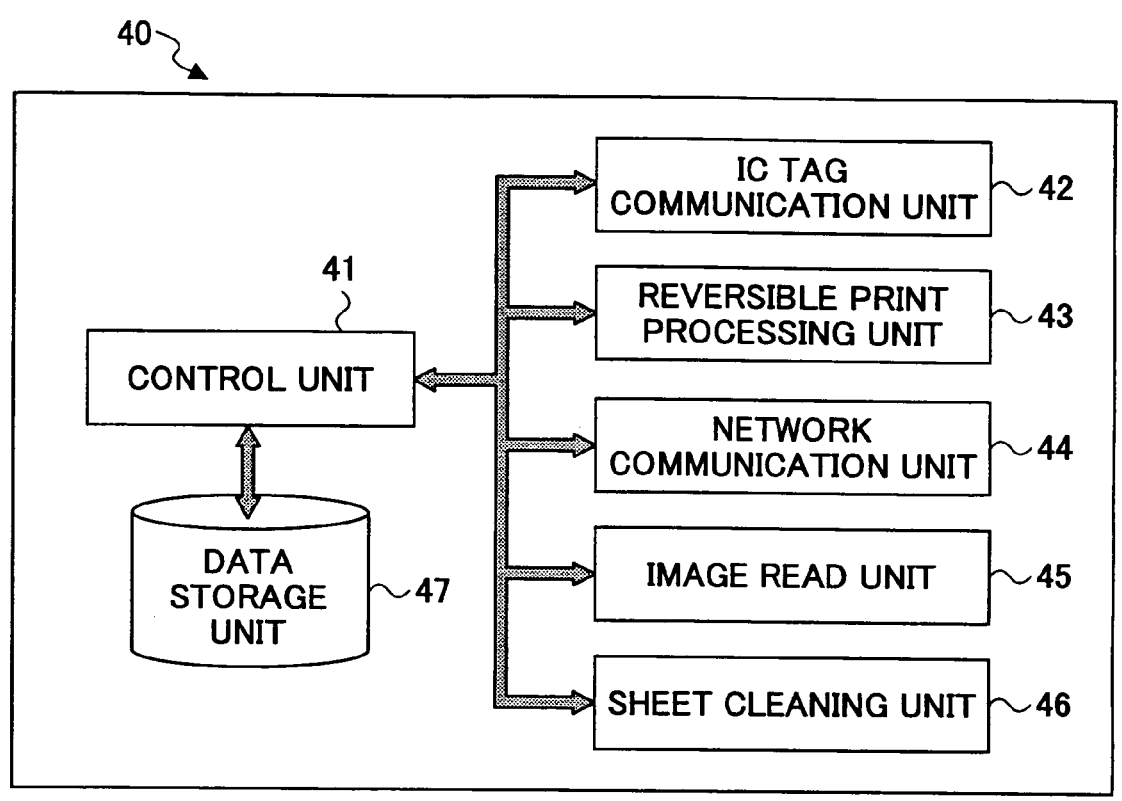
FIG. 3 is a block diagram illustrating a configuration of a printer according to an embodiment of the present invention.

As is shown in FIG. 3, the printer 40 includes a control unit 41, an IC tag communication unit 42, a reversible print processing unit 43, a network communication unit 44, an image read unit 45, a sheet cleaning unit 46, and a data storage unit 47. The control unit 41 is configured to control the respective units 42 through 47 of the printer 40 to perform various processes associated with the display contents of the rewritable paper 500. The control unit 41 includes a CPU, a RAM, and a ROM (not shown), for example, and executes process steps described in detail below that includes displaying information at a reversible display unit, storing display content data, acquiring display read data, acquiring the stored display content data, and extracting and outputting a difference between the display read data and the display content data, for example. Specifically, the control unit 41 is configured to execute control programs for controlling the respective units of the printer 40 to perform the above process steps.

The IC tag communication unit 42 corresponds to a reader unit for realizing non-contact data transmission/reception with the IC tag 510. Specifically, the IC tag communication unit 42 is configured to read/write data stored in the IC tag 510.

The reversible print processing unit 43 corresponds to a printing unit for writing print data in the rewritable display area 520 of the rewritable paper 500 or erasing print data displayed in rewritable display area 520. Specifically, the reversible print processing unit 43 is configured to perform a heating process to realize color formation and erasure of dye included in the rewritable display area 520.

The network communication unit 44 corresponds to an external interface unit for establishing connection with a network and is configured to receive data from a computer terminal and/or transmit data read from the rewritable paper 500 to the computer terminal, for example.

The image read unit 45 corresponds to a scanner unit for reading display contents of the rewritable paper 500. According to an embodiment, handwritten characters and/or symbols read by the image read unit 45 may be recognized by an OCR (optical character reader) function implemented in the control unit 41 to thereby be converted into text data.

The sheet cleaning unit 46 corresponds to a surface cleaning unit for cleaning the surface of the rewritable paper 500 in order to erase characters and/or symbols that are handwritten on the surface of the rewritable paper 500 with a special pen, for example.

The data storage unit 47 is configured to store data relating to various programs and/or data read from the rewritable paper 500. Also, the data storage unit 47 may store correspondence data associating an image pattern with a corresponding character/symbol to realize the OCR function as is described above. For example, the correspondence data may include pattern data of a handwritten signature of a particular person associated with name data of this person.

In the following, processes involving use of the rewritable paper 500 and the printer 40 for inspecting products to be shipped are described with reference to FIGS. 4 and 5.

(Shipment Form Generating Process)

Figure 4:
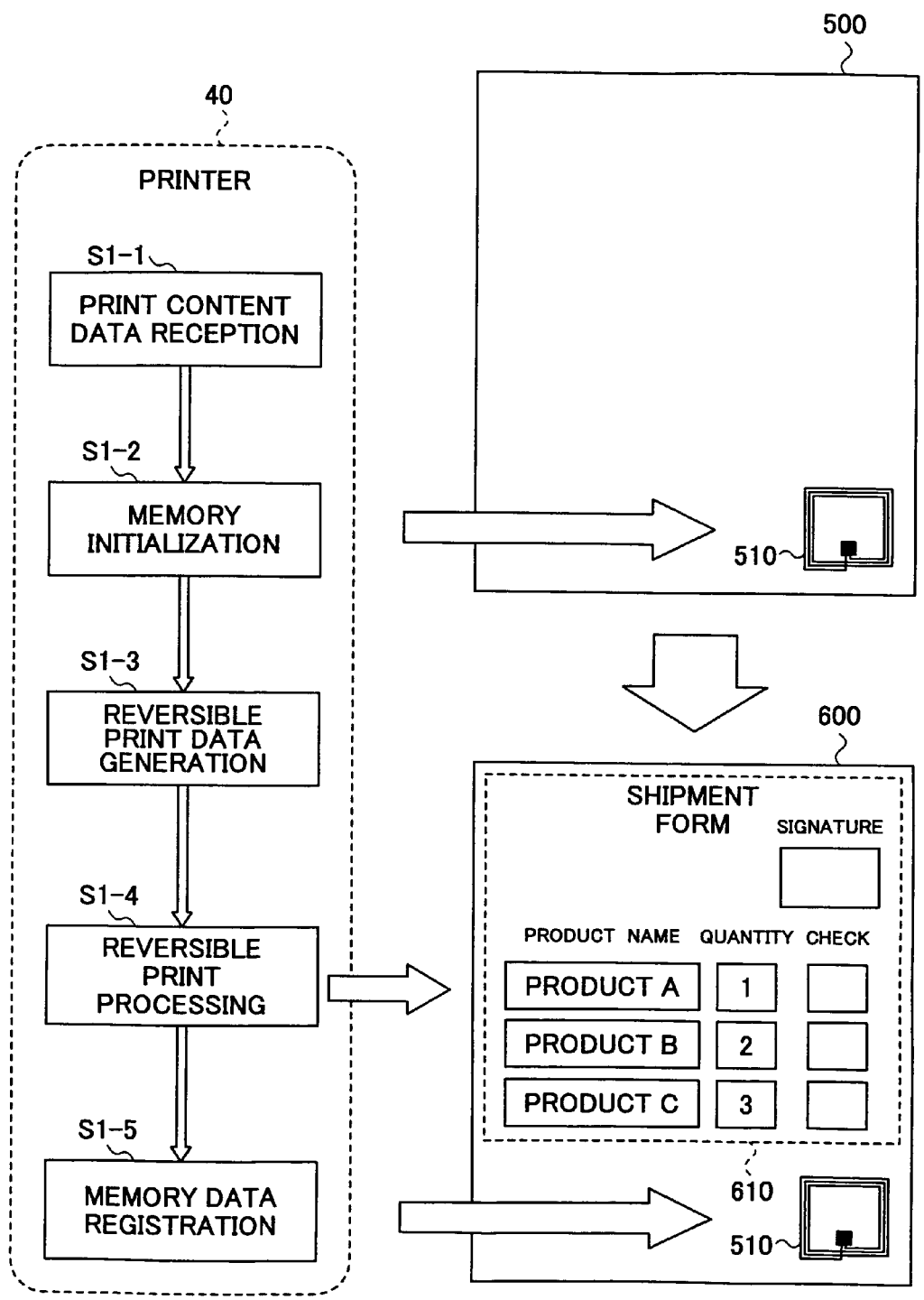
FIG. 4 is a diagram illustrating a process pertaining to shipment form generation according to an embodiment of the present invention.

FIG. 4 is a diagram illustrating a process pertaining to shipment form generating. In a shipment process, a person in charge of product shipment generates a shipment form pertaining to products to be shipped. Specifically, the person searches for products to be shipped for the day using a computer terminal (not shown) functioning as a process managing system for realizing shipment management. In a case where one or more products to be shipped for the day are found, the person inputs a command to the computer terminal for generating a shipment form pertaining to the products to be shipped. In this case, the computer terminal transmits display content data (print content data) for generating the shipment form to the printer 40 via a network.

The printer 40 receives the print content data to be displayed at the rewritable paper 500 (step S1-1). In the illustrated example, it is assumed that the print content data corresponds to data for outputting a shipment form for shipping one of product A, two of product B, and three of product C.

Upon receiving new data, the control unit 41 of the printer 40 initializes the RAM area 513 of the IC tag 510 (step S1-2). Specifically, the control unit 41 of the printer 40 sends a command for initializing the RAM area 513 to the CPU 511 of the IC tag 510 via the IC tag communication unit 42.

Then, the control unit 41 of the printer 40 generates reversible print data based on the print content data received from the computer terminal (step S1-3). Then, the control unit 41 uses the reversible print processing unit 43 to execute a reversible printing process based on the reversible print data (step S1-4). As a result, a shipment form display 610 as is shown in FIG. 4 is printed on the rewritable display area 520 of the rewritable paper 500. In this way, the shipment form may be visually perceived and checked.

Then, the control unit 41 of the printer 40 updates the memory of the IC tag 510 via the IC tag communication unit 42 (step S1-5). In the present example, the print content data received from the computer terminal are written in the RAM area 513 of the IC tag 510. In this way, the shipment form 600 is generated, and the shipment form generation process is ended.

(Product Inspection Process)

Figure 5:
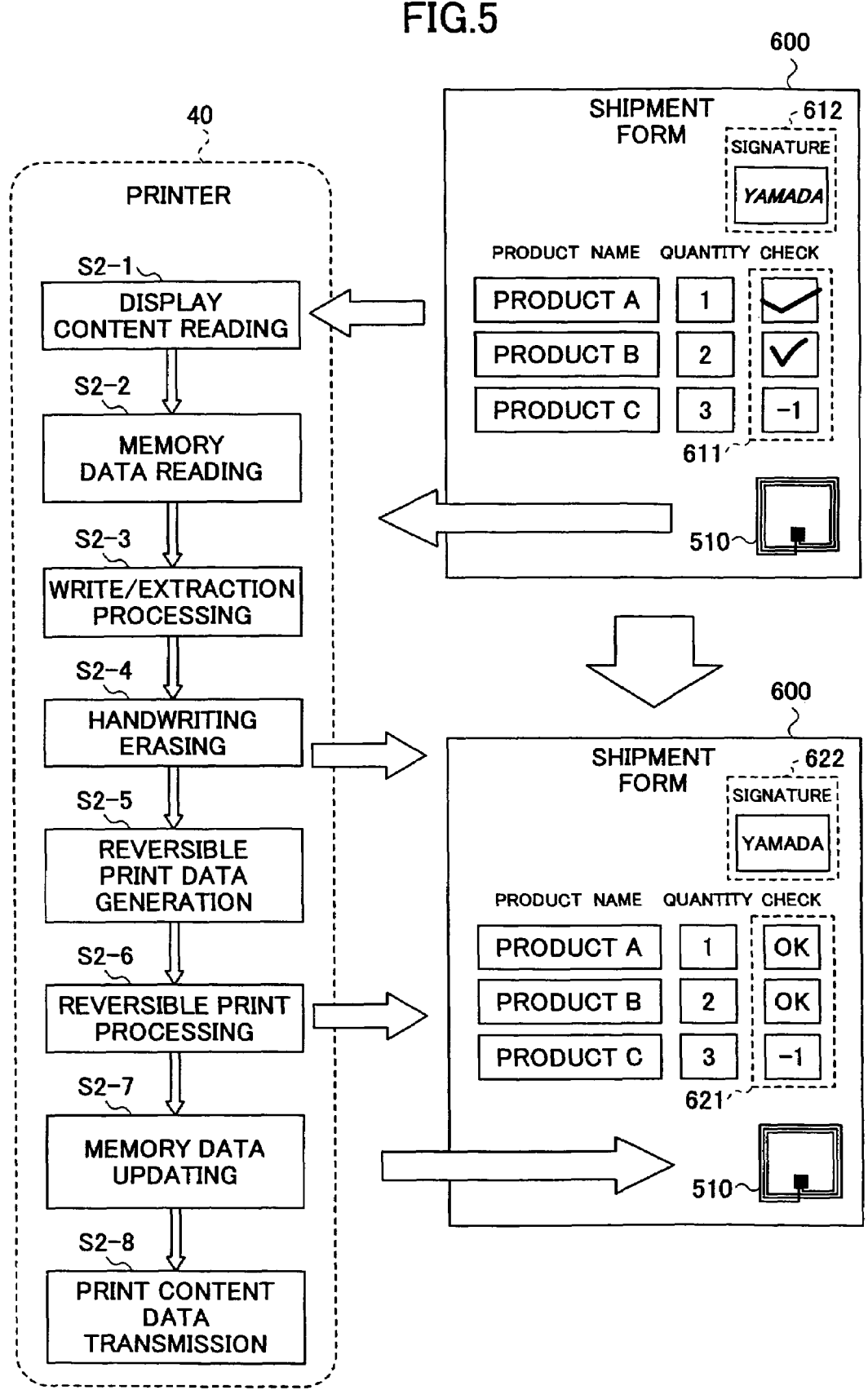
FIG. 5 is a diagram illustrating a process pertaining to product inspection according to an embodiment of the present invention.

FIG. 5 is a diagram illustrating a process pertaining to product inspection. According to an embodiment, products are inspected using the shipment form 600 generated in the shipment form generation process as is described above. Specifically, the actual products being shipped are compared with the product names listed in the shipment form 600 in order to determine whether the actual products being shipped match with the products listed in the shipment form 600. In the illustrated example, it is assumed that one of product A, two of product B, and three of product C are to be shipped according to the shipment form 600. In performing product inspection, checkboxes included in the shipment form 600 are used. For example, when the actual number of items of a certain product being shipped matches with a corresponding number indicated in the shipment form 600, a checkmark may be inscribed in a corresponding checkbox using a special pen for handwriting characters/symbols on the rewritable paper 500. When the actual number of items of a certain product is less than a corresponding number indicated in the shipment form 600, the number of items missing may be inscribed in a corresponding checkbox. In FIG. 5, a case is illustrated in which the actual number of items matches with the indicated number for product A and product B, but the actual number of items falls short by one with respect to the indicated number for product C. In turn, an inspection result (check result) display 611 is generated by marking the corresponding checkboxes for product A, product B, and product C in the shipment form 600. Then, after the product inspection is completed, a signature or a stamp may be inscribed in a signature box included in the shipment form 600 to generate a signature display 612. In this way, the product inspection process is ended.

According to the present embodiment, the person having completed product inspection inputs the shipment form 600 in the printer 40. In turn, the printer 40 reads the contents displayed in the rewritable display area 520 of the rewritable paper 500 (step S2-1). Specifically, the control unit 41 of the printer 40 acquires the display contents of the shipment form 600 as image data (read image data) via the image read unit 45.

Then, the printer 40 reads data stored in the memory of the IC tag 510 via the IC tag communication unit 42 (step S2-2). Specifically, the control unit 41 of the printer 40 acquires print content data stored in the RAM area 513 of the IC tag 510 via the IC tag communication unit 42 and the antenna unit 514.

Then, the printer 40 performs a write/extraction process (step S2-3). Specifically, the control unit 41 of the printer 40 generates image data (original image data) of the contents displayed in the rewritable display area 520 of the rewritable paper 500 based on the print content data acquired from the RAM area 513. In this way, image data of the shipment form display 610 are generated. Then, the control unit 41 compares the read image data that are read and acquired via the image read unit 45 and the original image data. In this way, contents written by the person in charge of shipment are extracted at the product inspection stage based on the difference between the read image data and the original image data.

Specifically, differences may be recognized in the inspection result display 611 and the signature display 612 between the shipment form 600 before inspection and the shipment for 600 after inspection. Accordingly, the control unit 41 of the printer 40 may determine that inscriptions have been made in the corresponding display portions of displays 611 and 612, and extract the images of these portions. In the illustrated example, the handwritten inscriptions representing the characters/symbols '✓', '−1', and 'Yamada' are extracted.

Then, the printer 40 performs an erasing process for erasing the handwritten inscriptions (step S2-4). Specifically, the control unit 41 of the printer 40 uses the sheet cleaning unit 46 to clean the portion of the surface of the rewritable paper 500 in which the handwritten inscriptions are made. In this way, the handwritten inscriptions of the inspection result display 611 and the signature display 612 are erased.

Then, the printer 40 generates reversible print data (step S2-5). In this step, the control unit 41 of the printer 40 performs a character recognition process on the images extracted in step S2-3. Specifically, the character recognition process is realized using correspondence data between image patterns and conversion characters that are stored in the data storage unit 47, and recognizing the images as characters according to the similarities between the images and the stored image patterns as in a conventional OCR process. In the present example, character recognition is performed on the handwritten inscriptions '✓', '−1', and 'Yamada'. It is noted that, the handwritten checkmark '✓' is converted into 'OK', the handwritten signature 'Yamada' is converted into characters 'Yamada' in a predetermined font. Then, reversible print data for reprinting the converted characters/symbols in their corresponding boxes are generated.

Then, the control unit 41 of the printer 40 performs a reversible printing process using the reversible print processing unit 43 (step S2-6). In this step, corresponding characters acquired from the character recognition process are reprinted in the corresponding portions in which the handwritten inscriptions have been made. In this way, an inspection result display 621 and a signature display 622 shown in FIG. 5 are printed in the shipment form 600.

Then, the printer 40 updates memory data via the IC tag communication unit 42 (step S2-7). Specifically, the control unit 41 of the printer 40 stores in the RAM area 513 of the IC tag 510 updated print content data reflecting the changes made in the display contents displayed in the rewritable display area 520 of the rewritable paper 500.

Then, the printer 40 transmits the updated print content data to the computer terminal performing shipping management via the network communication unit 44 (step S2-8). In this way, the product shipment may be managed by the computer terminal.

After transmission of the updated print content data is completed, the product inspection process is ended. It is noted that in a case where a missing product item is supplied after this process is ended, a checkmark may be inscribed in a corresponding checkbox of the shipment form 600, and a signature may be inscribed in the signature box. Then, steps S2-1 through S2-8 may be executed using the same shipment form 600.

In the following advantages that may be achieved by the one or more of the above embodiments of the present invention are described.

According to an embodiment described above, the rewritable paper 500 includes the rewritable display area 520 and the IC tag 510. The IC tag 510 includes the RAM area 513 in which the print content data displayed at the rewritable display area 520 are stored. The control unit 41 of the printer 40 generates the original image data displayed in the rewritable display area 520 of the rewritable paper 500 based on the print content data acquired from the RAM area 513. Then, the control unit 41 compares the read image data acquired by the image read unit 45 and the original image data. In this way, contents (image contents) written by the person in charge of shipment may be extracted at the product inspection stage based on the difference between the above two sets of data. Particularly, it is noted that by handwriting the contents directly onto the rewritable paper 500 displaying the shipment form 600, processing efficiency may be achieved.

According to an embodiment described above, the printer 40 includes a sheet cleaning unit 46 for erasing the handwritten contents (step S2-4). In this way, the handwritten characters/symbols of the inspection result display 611 and the signature display 612 are erased. Then, the printer 40 performs character recognition on the extracted image contents. Then, the control unit 41 of the printer 40 performs a reversible printing process using the reversible print processing unit 43 (step S2-6). In this step, characters obtained through the character recognition are reprinted on the portions in which their corresponding handwritten characters/symbols have been written. As a result, the inspection result display 621 and the signature display 622 are printed in the shipment form 600. By performing character recognition on manually inscribed contents and replacing (reprinting) the handwritten contents with characters obtained by the character recognition, visual information may be conveyed with accuracy.

According to an embodiment described above, the printer 40 updates the memory data via the IC tag communication unit 42 (step S2-7). Specifically, the control unit 41 of the printer 40 stores updated print content data reflecting the changes made to the display contents of the rewritable display area 520 of the rewritable paper 500 in the RAM area 513 of the IC tag 510. In this way, shipment may be managed based on the data stored in the RAM area 513 of the IC tag 510.

In the following, possible modifications that may be applied to one or more of the above embodiments are described.

According to an embodiment described above, a shipment form is printed in the rewritable display area 520 for use during product inspection. However, application of the rewritable paper 500 is not limited to such an example, and the present invention may be equally applied to other types of forms or cards that include display contents that may be visually perceived and in which handwritten inscriptions are made.

According to an embodiment described above, the rewritable display area 520 includes a reversible thermo-sensitive recording medium such as a thermo-chromic film. However, the configuration of the rewritable display area 520 is not limited to such an arrangement. For example, a display medium that is capable of electrically or optically rewriting visual information may be used. In other words, the present invention may be applied to any form or card that includes display contents that may be visually perceived and in which handwritten inscriptions are made.

According to an embodiment described above, the IC tag 510 is attached to the rewritable paper 500, and non-contact data transmission/reception is realized with respect to the printer 40 via the antenna unit 514. However, the present invention is not limited to such an embodiment, and for example, a contact type reversible display storage unit (e.g., an IC chip having one or more electrode pads or a magnetic tape) that includes a memory capable of recording print content data to be displayed in the rewritable paper 500 may be used. Also, it is noted that in one embodiment, two dimensional code may be generated based on the print content data, and the two dimensional code may be printed in the rewritable display area 520 to record original print content data in the rewritable display area 520.

Figure 6:
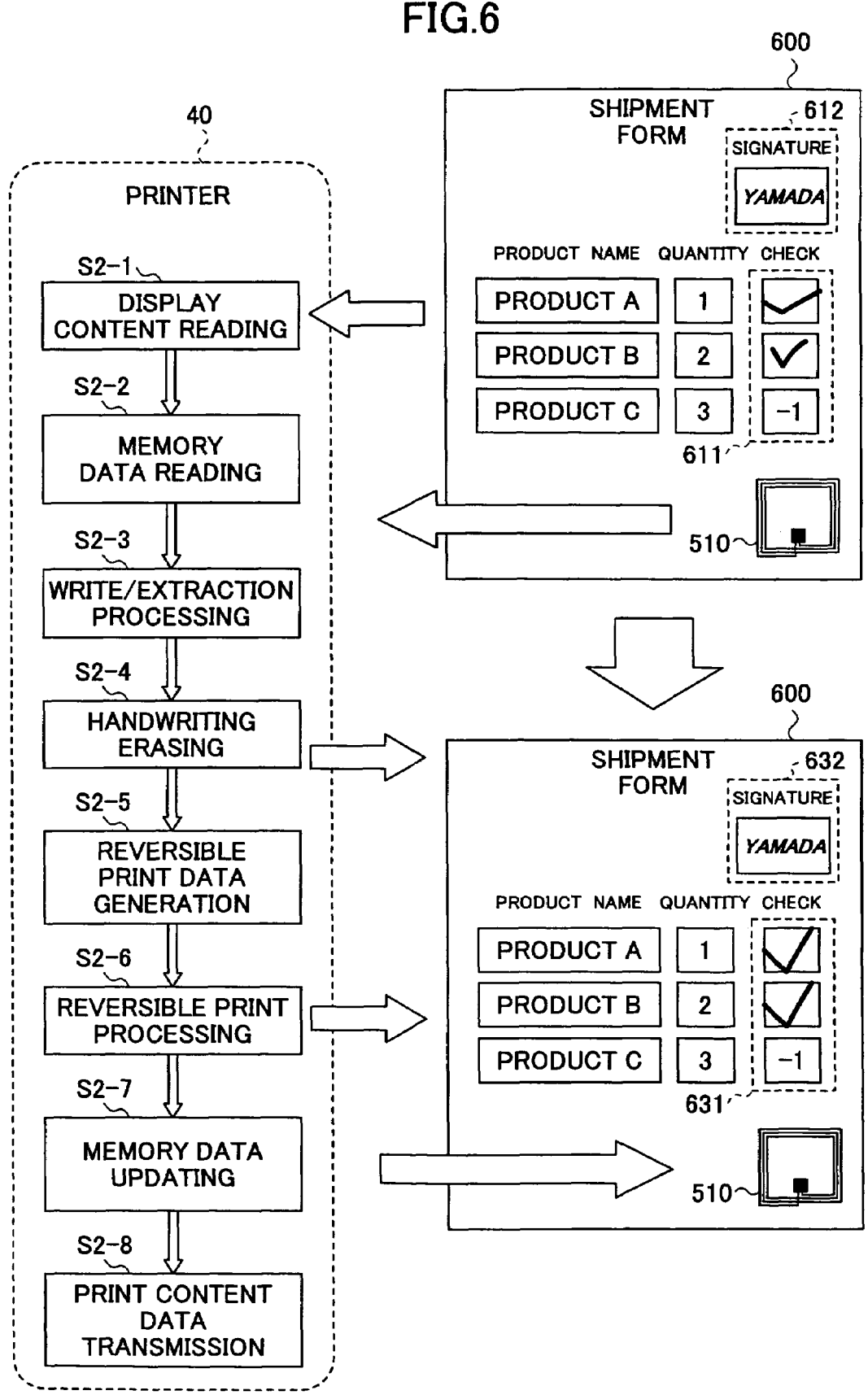
FIG. 6 is a diagram illustrating a process pertaining to product inspection process according to another embodiment of the present invention.

According to an embodiment described above, the control unit 41 of the printer 40 is configured to perform character recognition on the one or more images extracted in step S2-3. That is, the images of the display contents are recognized, converted, and (re)printed. As a result, symbols/characters that represent the same content/meaning as the additionally inscribed information but are different in shape from this information may be reversibly displayed. In another embodiment, reversible print data may be generated for printing recognized image contents as images. FIG. 6 is a diagram illustrating a process performed in is such a case. In the process of FIG. 6, in step S2-5, the control unit 41 directly uses the image data read and acquired by the image read unit 45 to generate reversible print data for reprinting. Specifically, the control unit 41 of the printer 40 reprints the image of the signature display 612 after performing image recognition thereon. On the other hand, when the control unit 41 performs image recognition on the inspection result display 611, the recognized image contents may be converted and printed. In this way an inspection result display 631 and a signature display 632 are printed. According to the present embodiment, handwritten signatures or other characters/symbols that cannot be converted may be reversibly displayed as in their original states.

[Guidance Managing Method, Guidance Managing Program, and Information Display Medium]

First Embodiment

In the following, a guidance managing method, a guidance managing program, and an information display medium according to a first embodiment of the present invention are described with reference to FIGS. 8 through 15. It is noted that the illustrative embodiments described below pertain to a case of guiding a user such as a carrier carrying products into a factory. In such a case, the carrier transporting the products carries a rewritable paper 1500 as is shown in FIG. 8 as an information display medium according to an embodiment of the present invention.

Figure 8:
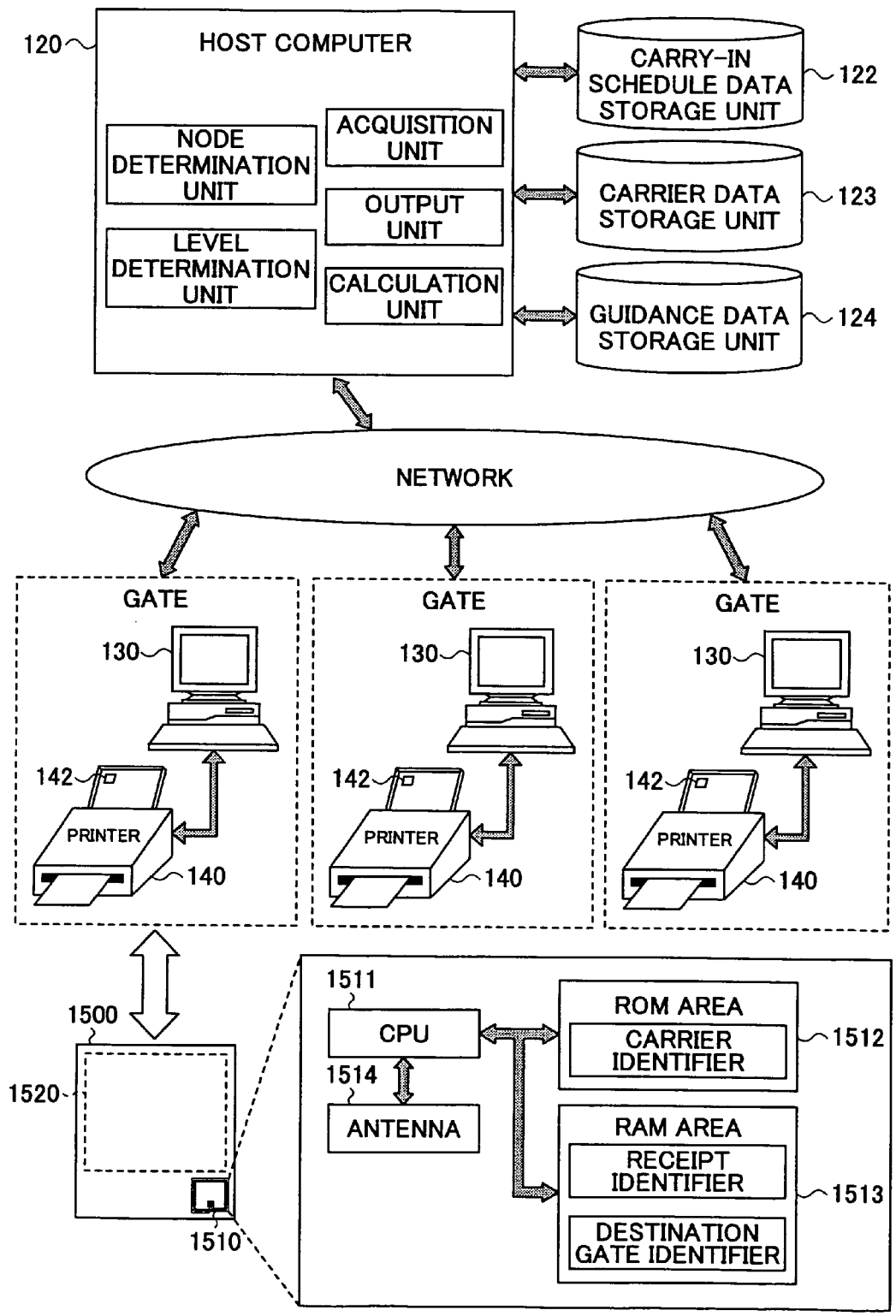
FIG. 8 is a diagram illustrating an overall configuration of a guidance managing system according to an embodiment of the present invention.

It is noted that the rewritable paper 1500 shown in FIG. 8 may have a physical configuration identical to that of the rewritable paper 500 shown in FIG. 2. That is, the rewritable paper 1500 may be in A4 size, for example, and includes a portion corresponding to a rewritable display area 1520, which is made up of a reversible thermo-sensitive storage medium such as a thermo-chromatic film.

The rewritable paper 1500 according to the present embodiment includes an IC tag 1510, which includes a CPU 1511, a ROM area 1512, a RAM area 1513, and an antenna unit 1514. The ROM area 1512 stores identification information (i.e., carrier identifier data) for identifying the rewritable paper 1500. The RAM area 1513 stores print content data corresponding to contents reversibly displayed at the rewritable display area 1520 (i.e., receipt identifier data and destination gate identifier data). It is noted that the destination gate identifier corresponds to a gate identifier specifying a gate as the node toward which the carrier carrying the rewritable paper 1500 is to proceed. The carrier identifier data and the receipt identifier data are described below. The antenna unit 1514 includes an antenna coil and is configured to realize non-contact data transmission/reception with a printer 140 described below.

In the factory, plural gates are set as nodes to check for the arrival of the carrier, and at each of these gates, a computer terminal 130 and a printer 140 connected to the computer terminal 130 are provided. In other words, according to the present embodiment, the computer 130 and the printer 140 comprise a node terminal.

Figure 12:
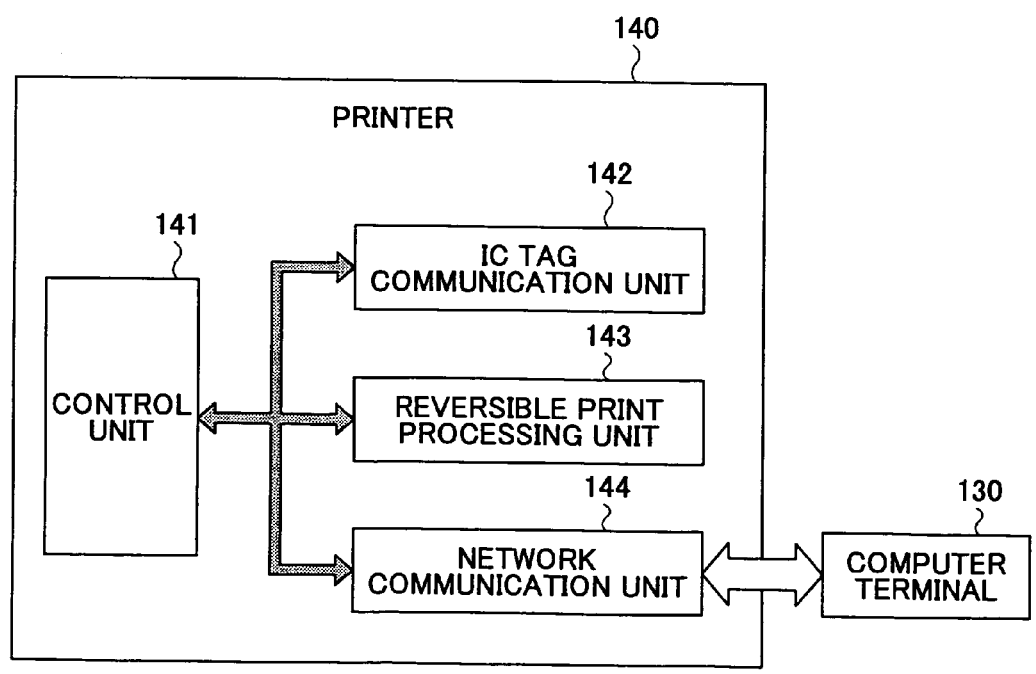
FIG. 12 is a block diagram illustrating a configuration of a printer used in the guidance managing system of FIG. 8.

The printer 140 functions as a reversible printing unit and is configured to realize data transmission/reception with respect to the rewritable paper 1500. As is shown in FIG. 12, the printer 140 includes a control unit 141, an IC tag communication unit 142, a reversible print processing unit 143, and a network communication unit 144. The control unit 141 is configured to control the units 142 through 144 of the printer 140 to read/write data from/in the IC tag 1510 of the rewritable paper 1500, for example.

The IC tag communication unit 142 functions as a transmission/reception unit of the node terminal, and is configured to realize non-contact data transmission/reception with respect to the IC tag 1510. According to the present embodiment, the IC tag communication unit 142 corresponds to an antenna, which is set at a paper feeding tray of the printer 140. The control unit 141 may control the IC tag communication unit 142 to read/write data from/in the IC tag 1510.

The reversible print processing unit 143 is configured to write print contents on the rewritable display area 1520 of the rewritable paper 1500 or erase print contents displayed at the rewritable display area 1520. Specifically, the reversible print processing unit 143 performs a heating process for inducing color formation/erasure of the dye included therein.

The network communication unit 144 functions as an external interface unit that is connected to external elements such as the computer terminal 130. The control unit 141 controls the network communication unit 144 to receive data from the computer terminal 130, or transmit data read from the rewritable paper 1500 to the computer terminal 130, for example.

The computer terminal 130 shown in FIG. 8 includes a CPU, a RAM, and a ROM, and is configured to realize data transmission/reception with respect to the printer 140, acquire data stored in the rewritable paper 1500 via the printer 140, and/or store data in the rewritable paper 1500, for example. Also, it is noted that the computer terminal 130 stores identifier data (current gate identifier) for identifying its corresponding gate, and realizes data transmission/reception with respect to a host computer 120 via a network N. The computer terminal 30 is configured to transmit data stored in the rewritable paper 1500 to the host computer 120 and store data received from the host computer 120 in the rewritable paper 1500.

The host computer 120 is configured to manage products being carried into the factory via the computer terminals 130 stationed at the gates. Specifically, the host computer 120 includes a CPU, a RAM, and a ROM, for example, and is configured to execute various steps such as a node determination step, an acquisition step, an output step, a level determination step, and a calculation step of a process described below. According to an embodiment, the host computer 20 executes a guidance managing program to realize functions of a node determining unit, an acquisition unit, an output unit, a level determining unit, and a calculation unit.

The node determining unit acquires receipt identifier data stored in the IC tag 1510 of the rewritable paper 1500 via the computer terminal 130 and the printer 140 making up the node terminal, and identifies the next gate toward which the carrier is to proceed from the carry-in schedule data storage unit 22 based on the receipt identifier data.

The acquisition unit acquires guidance data from a guidance storage unit 24 that provides guidance from the gate at which the printer 140 is stationed to a next gate. It is noted that the acquisition unit acquires guidance data according to the carrier action history level of the identified carrier. Also, it is noted that the acquisition unit acquires guidance data according to priority.

The output unit outputs the acquired guidance data to the rewritable display area 1520 of the rewritable paper 1500 via the computer terminal 130 and the printer 140. The output unit may erase information reversibly displayed at the rewritable display area 1520 of the rewritable paper 1500 and reversibly display information at the rewritable display area 1520 based on the acquired guidance data.

The level determination unit acquires carrier identifier data stored in the IC tag 1510 of the rewritable paper 1500 via the IC tag communication unit 142 of the printer 140, and determines the carrier action history level of the identified carrier. The calculation unit calculates a priority level based on the receipt identifier data acquired via the IC tag communication unit 142 of the printer 140.

The host computer 120 also includes a carry-in schedule data storage unit 122 as an action schedule data storage unit, a carrier data storage unit 123 as an action history data storage unit, and a guidance data storage unit 124 as a guidance data storage unit.

Figure 9:
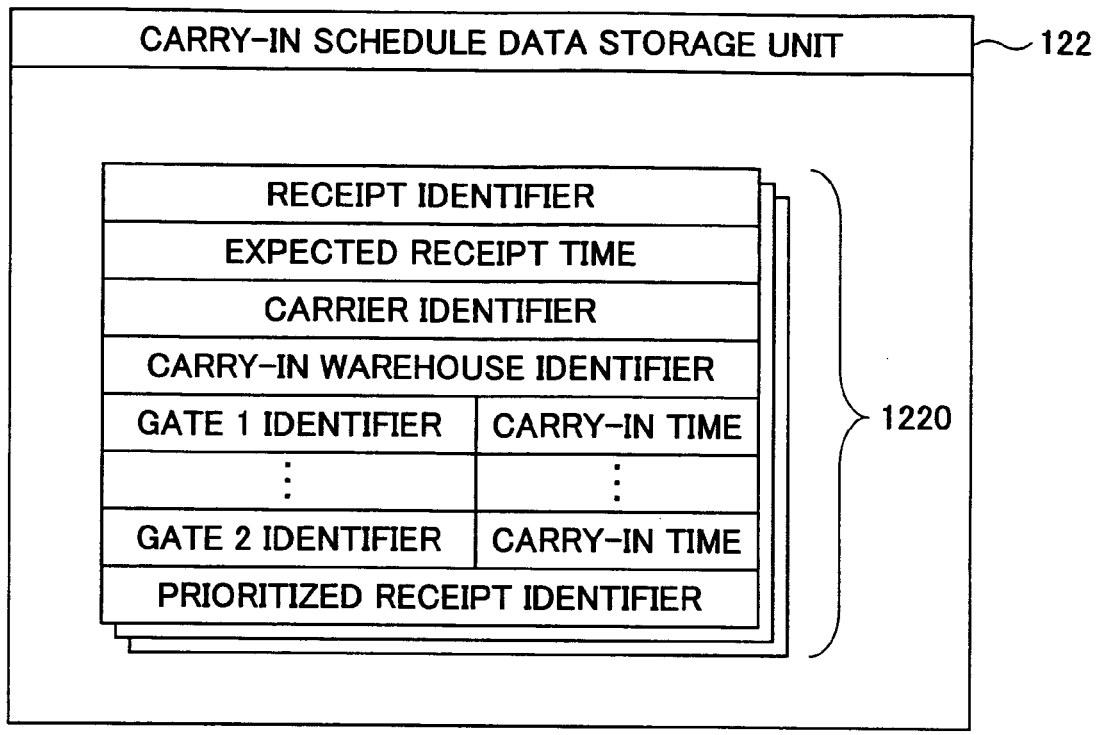
FIG. 9 is a diagram illustrating a configuration of data stored in a carry-in schedule data storage unit.

In FIG. 9, the carry-in schedule data storage unit 122 stores carry-in schedule data 1220 as action schedule data. The carry-in schedule data 1220 may be recorded when a new schedule for carrying in products is issued. The carry-in schedule data 1220 includes data pertaining to a receipt identifier, an expected receipt time, a carrier identifier, a carry-in warehouse identifier, a gate identifier, a carry-in time, and a prioritized receipt identifier. According to the present embodiment, the receipt identifier data corresponds to action determining data, and the carrier identifier data corresponds to user data.

In a receipt identifier data area, data pertaining to an identifier for identifying a receipt of products are stored.

In an expected receipt time data area, data pertaining to the expected time of receipt of products are stored. In the illustrated example, the expected arrival time of the products at the factory site reception is stored.

In a carrier identifier data area, data pertaining to the carrier carrying in the products are stored.

In a carry-in warehouse data area, the carry-in warehouse into which the products are to be carried are stored.

Figure 7:
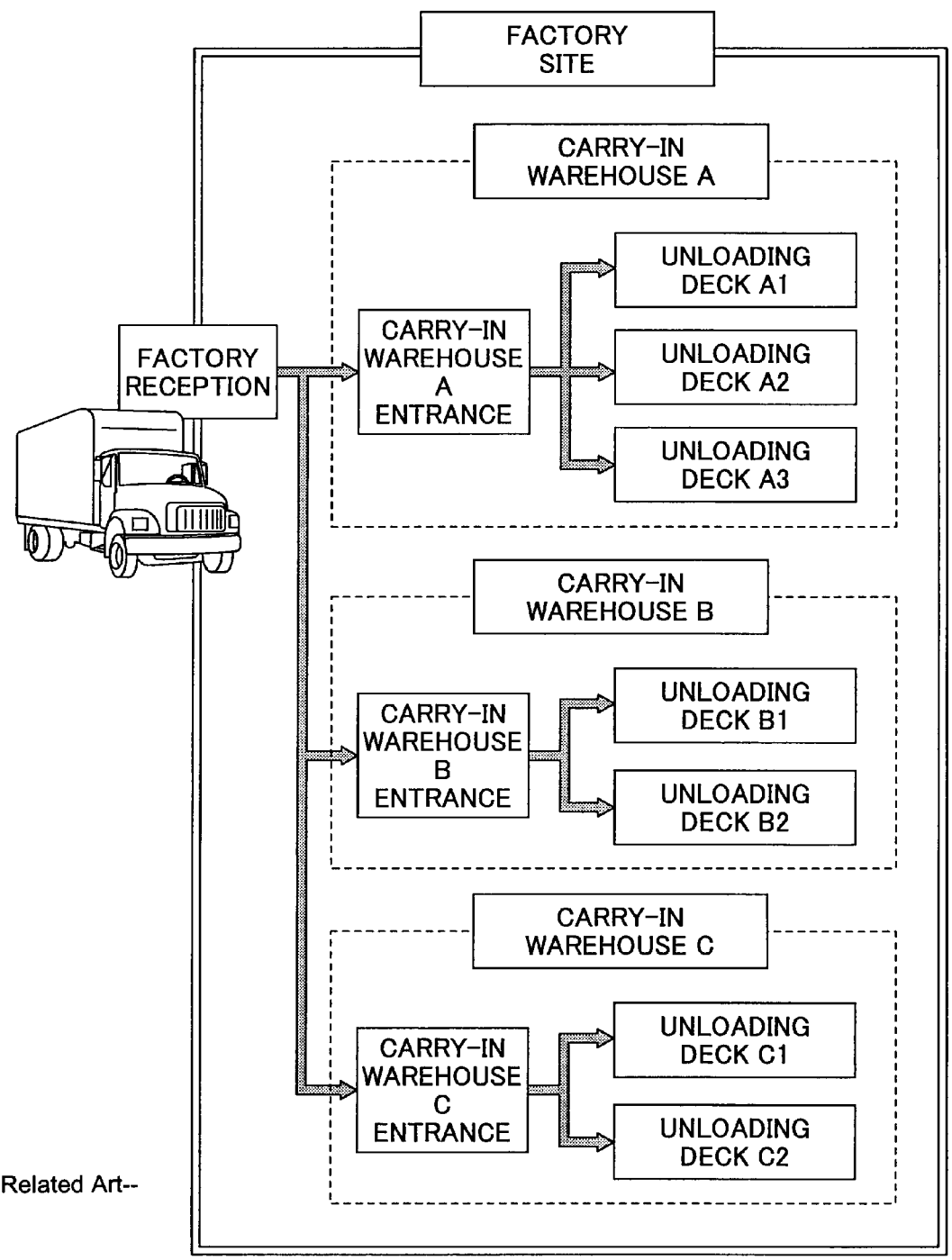
FIG. 7 is a diagram illustrating an overall carry-in process flow.

In a gate identifier data area, gate identifiers of gates that are to be passed from the factory reception to the unloading location of the products are stored in the order in which the gates are to be passed. Specifically, in the example of FIG. 9, the gate identifier of the gate established at the factory reception is stored as the 'GATE 1 IDENTIFIER', which corresponds to the initial value of the gate identifier data area. Then, as the 'GATE 2 IDENTIFIER' through 'GATE N IDENTIFIER', gate identifiers of intermediary gates that are passed on the way to the product unloading point are stored in the order in which they are to be passed. Also, as the final entry of the gate identifier data area, the gate identifier identifying the carry-in warehouse into which the products are carried is stored. In the illustrated example of FIG. 7, the carrier passes the carry-in entrance of the warehouse, and accordingly, the identifier representing the factory site reception gate is stored as the 'GATE 1 IDENTIFIER', the identifier representing the carry-in entrance gate is stored as the 'GATE 2 IDENTIFIER', and the identifier representing the carry-in warehouse is stored as the 'GATE 3 IDENTIFIER'.

In a carry-in time data area, data pertaining to the time at which the products have arrived at the gate identified by the gate identifier are stored. According to one embodiment, the departure time of the carrier from the carry-in warehouse may be stored as the carry-in time data for the carry-in warehouse.

In a prioritized receipt identifier data area, data pertaining to a receipt identifier for identifying a receipt of products that should be prioritized over the present receipt of products are stored. When no data are stored in this area, this means that there is no receipt of products that should be handled before the present receipt of products.

Figure 10:
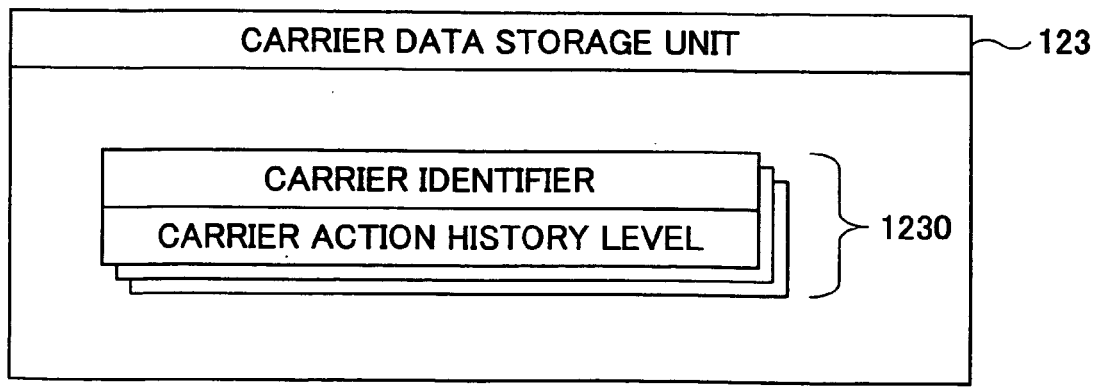
FIG. 10 is a diagram illustrating a configuration of data stored in a carrier data storage unit.

The carrier data storage unit 123 stores carrier data 1230 as is shown in FIG. 10. The carrier data 1230 are stored upon making a deal with a new carrier to carry in products. The carrier data 1230 includes data pertaining to a carrier identifier and a carrier action history level of the carrier.

In a carrier identifier data area, data pertaining to an identifier for identifying a carrier are stored.

In a carrier action history level data area, data pertaining to the carrier action history level of the carrier are stored. The carrier action history level of the carrier is determined depending on the products and the number of times the carrier has handled a carry-in process in the past. That is, the degree to which the present carrier is acquainted with the arrangement and regulations of the factory may be determined based on this carrier action history level, and guidance contents may be adjusted according to the acquaintance level of the carrier. It is noted that in one embodiment, the carrier action history level data may correspond to user level data.

Figure 11:
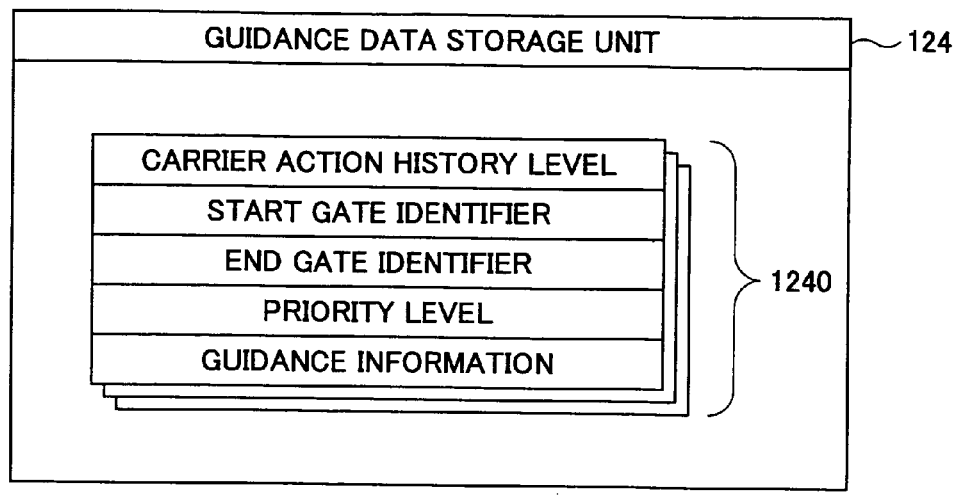
FIG. 11 is a diagram illustrating a configuration of data stored in a guidance data storage unit.

The guidance data storage unit 124 stores guidance data 1240 according to the carrier action history level as is shown in FIG. 11. The guidance data 1240 includes data for guiding the carrier through the route passing the gates between a start gate and an end gate. The guidance data 1240 are stored when the gates are set. The guidance data 1240 includes data pertaining to the carrier action history level, a start gate identifier, an end gate identifier, priority information, and guidance information.

In a carrier action history level data area, data pertaining to the action history level with respect to the carry-in experience of the carrier carrying in the products are stored.

In a start gate identifier data area, data pertaining to an identifier identifying the gate corresponding to a start point of the guide route are stored.

In an end gate identifier data area, data pertaining to an identifier identifying the gate corresponding to an end point of the guide route are stored.

In a priority data area, data pertaining to the priority level of the guide route are stored. According to one embodiment, the priority level may be set as 'LOW', 'INTERMEDIATE', or 'HIGH'. The priority level may be set to 'LOW' when another receipt of products should be processed before the receipt of current products being carried in. In this case, a standby command may be issued, for example. The priority level may be set to 'INTERMEDIATE' when the current receipt of products is handled irrespective of another receipt of products. In this case, guidance through a normal route may be issued, for example. The priority level may be set to 'HIGH' when the current receipt of products is delayed with respect to an expected carry-in time. In this case, guidance through a prioritized route may be issued.

In a guidance information data area, data pertaining to guidance information on a guide route are stored. For example, the guidance information data may include a map of the guide route and precautions to be taken upon being guided through the route (e.g., a speed limit imposed within the factory site).

In the following, process steps that are performed in the case of carrying in products using the rewritable paper 1500 and the printer 140 are described. Specifically, first, the overall process for carrying in and unloading products at a factory warehouse are described. Then, a gate reception process that is performed by the computer terminal 130 (FIG. 14) and a guidance managing process that is performed by the host computer 120 (FIG. 15) are described.

According to one embodiment, a carrier carrying in products to a factory uses the rewritable paper 1500 having a carrier identifier of the present carrier stored in the ROM area 1512. Also, the computer terminal 130 connected to the network N and/or the printer 140 may be provided at the office of the carrier, for example.

Figure 13:
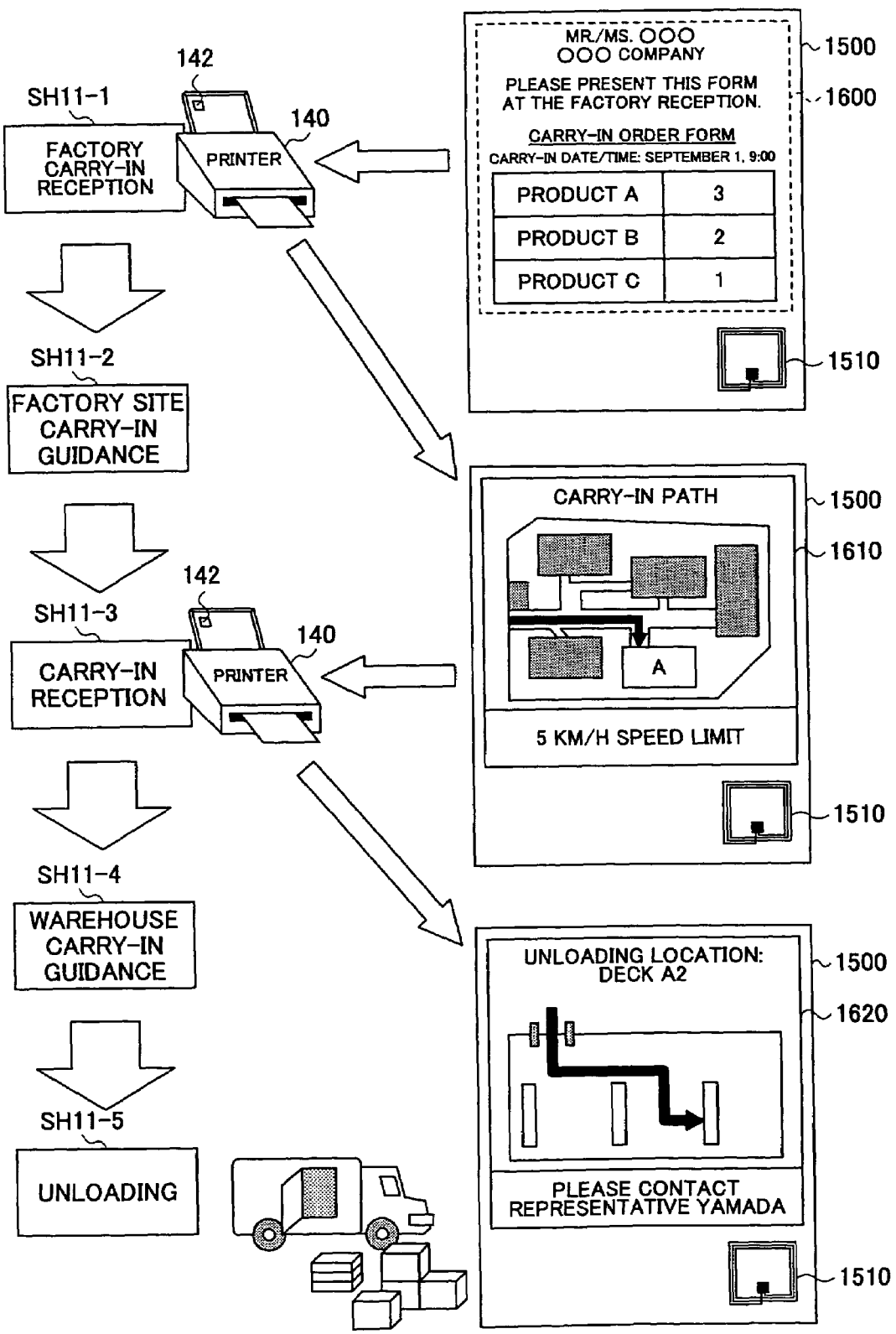
FIG. 13 is a diagram illustrating a carry-in process flow according to an embodiment of the present invention.

Upon requesting shipment of products to a carrier, a receipt identifier, an expected receipt time, a carrier identifier, and a carry-in warehouse identifier are specified and stored in the carry-in schedule data storage unit 122. In turn, the host computer 120 identifies the computer terminal 30 of the carrier based on the carrier identifier, and transmits a shipment order to the identified terminal computer 30 via the network N. The shipment order includes a destination gate identifier, a receipt identifier, and a list of products that are requested. In the present example, the gate identifier representing the factory reception gate is included as the destination gate identifier Upon receiving the product shipment order via the computer terminal 130 connected to the network N, the carrier prints the shipment order on the rewritable paper 1500 using the printer 140. In this case, the printer 140 stores the receipt identifier and the gate identifier of the factory reception gate included in the shipment order in the RAM area 1513 of the rewritable paper 1500. Also, it is noted that a shipment order form 1600 as is shown in FIG. 13 is reversibly displayed at the rewritable display area 1520 of the rewritable paper 1500.

Then, the carrier transports the ordered products and the rewritable paper 1500 to the factory, and when the carrier enters the factory site, a factory carry-in reception step is performed (step SH11-1). For example, this step may be started when the carrier inserts the rewritable paper 500 brought along with the ordered products into the printer 140 that is provided at the factory entrance gate. In turn, a gate reception process and a guidance management process are performed the details of which are described below. As a result, the rewritable paper 1500 is rewritten. Specifically, in place of the shipment order form displayed at the rewritable display area 1520, factory site guidance information 1610 including a guide map of a route to a next gate (i.e., carry-in entrance of the warehouse A in the illustrated example) and precautions such as a speed limit to be considered upon carrying in the products is reversibly displayed at the rewritable display area 1520.

Then, based on the factory site guidance information 1610 reversibly displayed at the rewritable display area 1520 of the rewritable paper 1500, carry-in guidance within the factory site is performed (step SH11-2). In this case the carrier heads toward warehouse A corresponding to the carry-in destination of the products according to the carry-in guidance.

Then, when the carrier reaches warehouse A, carry-in reception is performed at the carry-in entrance gate of warehouse A (step SH11-3). In this case, the carrier inserts the rewritable paper 1500 into the printer 140 provided at the carry-in entrance gate of the warehouse A.

In turn, a gate reception process is performed, the details of which are described below. As a result, the rewritable display area 1520 of the rewritable paper 1500 is rewritten. Specifically, in place of the factory site guidance information 1610 reversibly displayed at the rewritable display area 1520 of the rewritable paper 1500, warehouse guidance information 1620 including information for reaching an unloading location within the warehouse and the person in charge of the present receipt of products is reversibly displayed at the rewritable display area 1520.

Then, based on warehouse guidance information 1620 reversibly displayed at the rewritable display area 1520 of the rewritable paper 1500, carry-in guidance within the carry-in warehouse is performed (step SH11-4). Accordingly, the carrier heads toward the unloading location 'DECK A2' corresponding to the carry-in destination of the products.

Then, upon reaching the unloading location 'DECK A2', the carrier contacts the person in charge of the present receipt of products according to the information stored in the rewritable display area 1520, and unloads the carried-in products (step SH11-5).

When the carrier finishes unloading the carried-in products to then leave the factory, the carrier inserts the rewritable paper 1500 into the printer 140 provided at the factory reception gate. In this way, it may be determined that the receipt of the products have been completed.

(Gate Reception Process and Guidance Managing Process)

In the following, the gate reception process executed by the gates and the guidance managing process executed by the host computer 120 are described in detail with reference to FIGS. 14 and 15. It is noted that examples of the above processes involving the factory reception gate are described below.

As is described above, upon reaching the gate, the carrier inserts the rewritable paper 1500 into the printer 140 provided at this gate. In turn, the IC tag communication unit 142 of the printer 140 establishes communication with the IC tag 1510 of the rewritable paper 1500. In this way, the computer terminal 130 connected to the printer 140 reads data from the IC tag 1510 of the rewritable paper 1500 (step S11-1). In this case, data pertaining to the carrier identifier stored in the ROM area 1512 and the receipt identifier stored in the RAM area 1513 are read.

Then, the computer terminal 130 performs data transmission/reception with the host computer 120 to acquire guidance data (step S11-2). In this case, the computer terminal 130 transmits the data pertaining to the carrier identifier and the receipt identifier read in step S11-1 and the data pertaining to the gate identifier identifying the gate at which the computer terminal 130 is set (current location gate identifier) to the host computer 120 via the network N.

Figure 15:
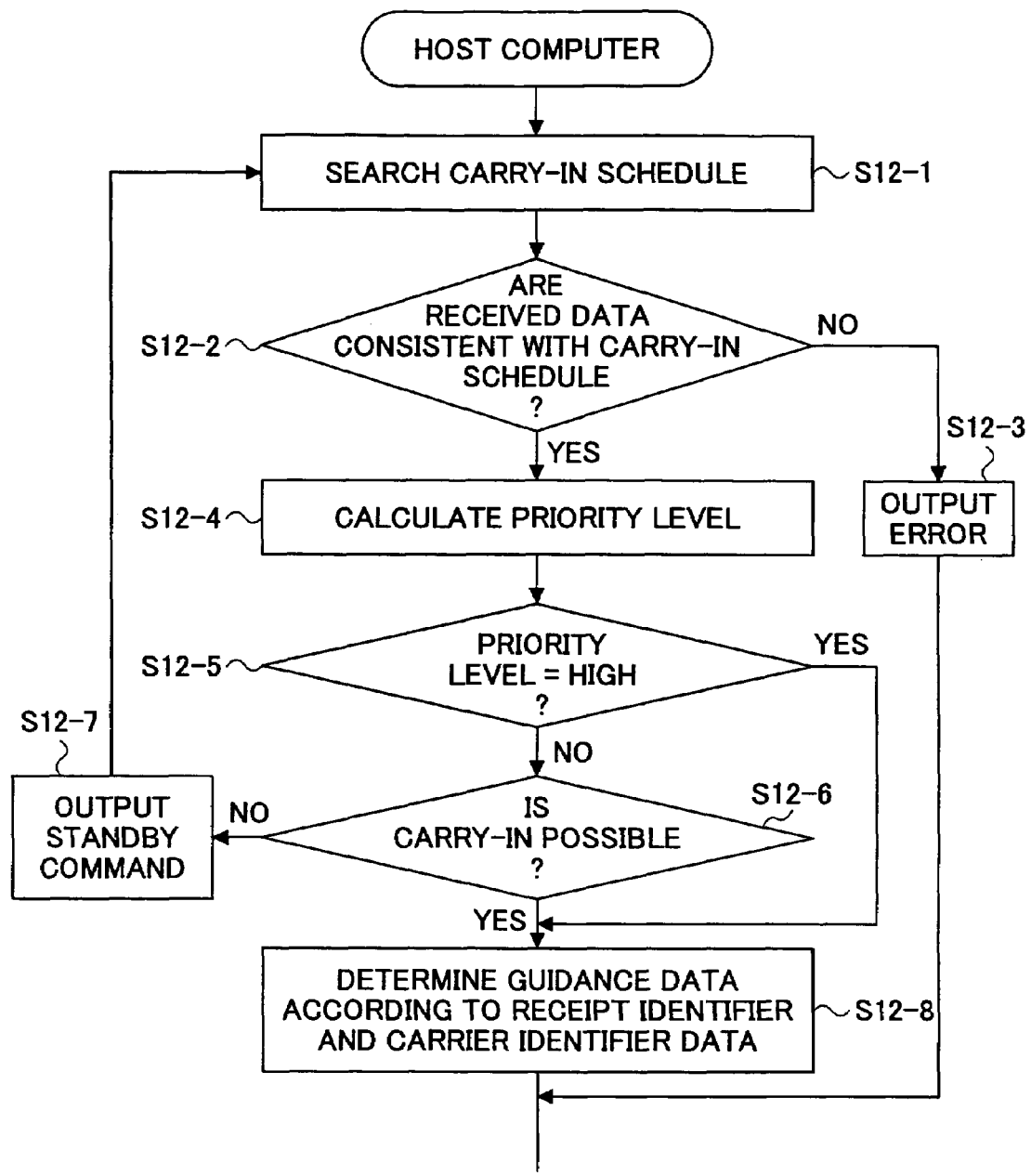
FIG. 15 is a diagram illustrating a guidance managing process according to an embodiment of the present invention.

In turn, the host computer 120 executes a guidance management process as is illustrated in FIG. 15.

The host computer 120 that receives data pertaining to a carrier identifier and a receipt identifier from plural computer terminals 130 stationed at plural gates is configured to search carry-in schedule data 1220 based on the received receipt identifier (step S12-1). Specifically, the host computer 120 extracts carry-in schedule data 1220 including the received receipt identifier from the carry-in schedule data storage unit 122. Then, the host computer 120 determines whether the carrier identifier data included in the extracted carry-in schedule data 1220 and the received carrier identifier data correspond. In a case where the data do not correspond, error output is performed as is described below (step S12-3).

Further, the host computer 120 determines whether the carry-in schedule is consistent (step S12-2). Specifically, the host computer 120 compares the current location gate identifier received from the computer terminal 130 and the gate identifier included in the carry-in schedule data 1220 for which the carry-in time is not recorded. If it is determined that the received current location gate identifier is not consistent with the carry-in schedule (step S12-2, NO), an error output is generated (step S12-3). For example, when the current location gate is different from the gate to which the carrier should be guided, or when the current carrier is different from the registered carrier, the host computer 120 may display a warning. In this case, the host computer 120 reads the destination gate identifier stored in the RAM area 1513 of the rewritable paper 1500, and reversibly displays information for guiding the carrier to the correct gate based on the read destination gate identifier. In this way, an error in a carry-in operation may be detected and corrected.

On the other hand, when it is determined that the current standing of the carrier is consistent with the carry-in schedule (step S12-2, YES), the host computer 120 records the time at which the receipt identifier has been received as the carry-in time, and then calculates the priority level of the corresponding receipt of products (step S12-4). Specifically, the host computer 120 compares the received carry-in time with a corresponding expected carry-in time included in the carry-in schedule data 1220. Upon determining that the current carry-in operation is delayed over a permissible time (e.g., fifteen minutes), the host computer 120 sets the priority level of the receipt identifier received from the computer terminal 130 as 'HIGH'.

On the other hand, when the receipt identifier is received within the permissible time with respect to the expected carry-in time, the host computer 120 determines whether prioritized receipt identifier data are present. If no priority receipt identifier data are set in the carry-in schedule data 1220, the host computer 120 sets the priority level of the present receipt identifier to 'INTERMEDIATE'.

If prioritized receipt identifier data are set in the carry-in schedule data 1220, the host computer 120 acquires the receipt schedule data 1220 of this prioritized receipt identifier. Upon determining that the carry-in operation of this prioritized receipt identifier is completed and the carry-in time is recorded in the corresponding carry-in schedule data 1220, the host computer 120 sets the priority level of the present receipt identifier to 'INTERMEDIATE'. On the other hand, if the receipt schedule data 1220 of the prioritized receipt identifier is incomplete and the carry-in time is not recorded therein, the priority level of the present receipt identifier is set to 'LOW'. In this way, the priority level of a carry-in operation is determined depending on the carry-in operation standing of other products.

Then, the host computer 120 adjusts the guidance according to the calculated priority level (step S12-5). Specifically, when the priority level calculated in step S12-4 is not 'HIGH' (step S12-5, NO), the host computer 120 determines whether the present carry-in operation may be performed based on the prioritized receipt or the expected receipt time included in the carry-in schedule data 1220 (step S12-6). Specifically, the host computer 120 determines the congestion degree at the carry-in entrance or within the carry-in warehouse based on the carry-in schedule data 1220. Upon determining that a prioritized receipt or a receipt with an earlier expected receipt time has arrived, a determination is made as to whether space is left for unloading the present products being carried in.

If it is determined that the present products cannot be carried in (step S12-6, NO), the host computer 120 outputs a standby command (step S12-7). Specifically, the host computer 120 transmits command data to the computer terminal 130 containing an instruction to wait for a predetermined time period. In turn, the computer terminal 130 converts the command data into reversible print data and transmits the converted reversible print data to the printer 140. The printer 140 uses the reversible print data to reversibly print a standby command message on the rewritable paper 1500.

On the other hand, in a case where the present carry-in operation may be performed (step S12-6, YES), the host computer 120 determines guidance data based on the receipt identifier and the carrier action history level (step S12-8). Specifically, the host computer 120 extracts a carrier identifier from the carry-in schedule data 1220 of the present receipt identifier. Also, the host computer 120 acquires the carrier action history level of the corresponding carrier based on the extracted carrier identifier.

Then, the host computer 120 extracts guidance data 1240 from the guidance data storage unit 124. Specifically, the host computer 120 extracts guidance data 1240 including the acquired carrier action history level, the start gate identifier, the end gate identifier, and the priority level calculated in step S12-4. In the present example, the start gate identifier corresponds to the identifier representing the gate at which the computer terminal 130 that has acquired the present receipt identifier is stationed. The end gate identifier corresponds to an identifier representing a gate stored in the receipt schedule data 1220 as the next gate to be reached from the start gate. In the case where the priority level of the preset receipt is set to 'INTERMEDIATE', a normal route is reversibly displayed. In the case where the priority level is set to 'HIGH', a route that has carry-in priority over a corresponding normal route with the same departure gate and destination gate is reversibly displayed.

Then, the extracted guidance data 1240 is transmitted to the computer terminal 130. In this way, the computer terminal 30 acquires guidance data from the host computer 120 (step S11-2), and the guidance managing process of the host computer 120 is ended.

Figure 14:
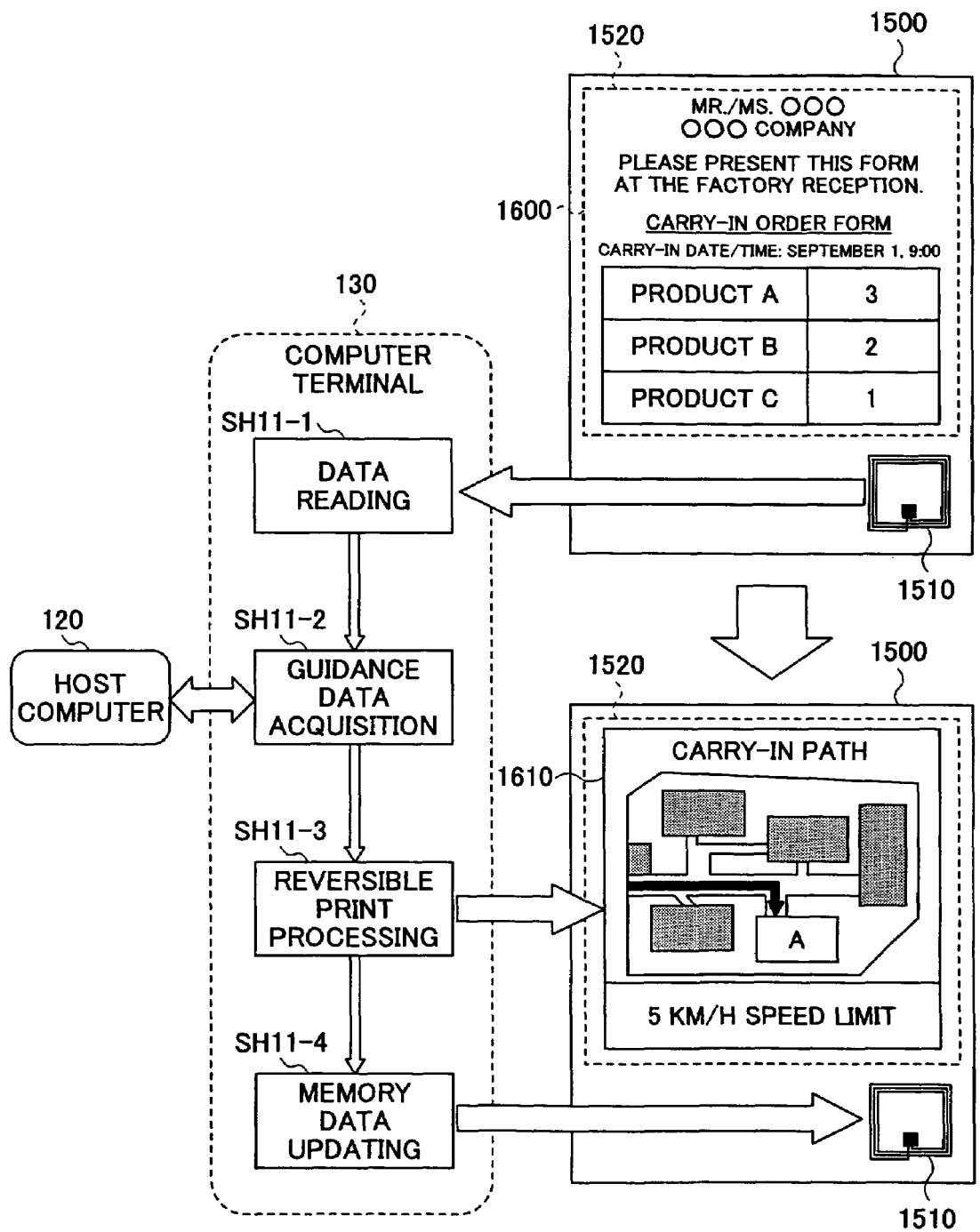
FIG. 14 is a diagram illustrating a gate reception process according to an embodiment of the present invention.

The computer terminal 130 that receives the guidance data from the host computer 120 performs a reversible printing process as is shown in FIG. 14 (step S11-3). Specifically, the computer terminal 130 generates reversible print data based on the guidance data acquired in step S11-2. Then, the computer terminal 130 transmits the generated reversible print data to the printer 140. In turn, the control unit 141 of the printer 140 controls the reversible print processing unit 143 to perform a reversible printing process based on the reversible print data.

Specifically, in the reversible printing process, a reversible display printed at the rewritable display area 520 of the rewritable paper 500 (e.g., the receipt order form 1600 at the factory reception gate, or the factory site guidance information 1610 at the carry-in entrance reception gate) is erased. Then, new guidance (e.g., the factory site guidance information 1610 at the carry-in entrance reception gate, or the warehouse guidance information 1620 at the carry-in reception gate) is printed on the rewritable display area 1520. In this way, the carrier may visually perceive the carry-in destination of products.

Then, the control unit 141 of the printer 140 updates data of the memory of the IC tag 1510 via the IC tag communication unit 142 (step S11-4). In this step, the end gate identifier is written in the RAM area 1513 of the rewritable paper 1500 as the destination gate identifier. In this way, the rewritable paper 1500 is rewritten, and the gate reception process is ended.

In the following, advantages that may be achieved in one or more of the embodiments described above are described.

According to an embodiment described above, upon reaching a given gate, the carrier inserts the rewritable paper 1500 into the printer 140 stationed at this gate. In this way, the computer terminal 130 that is stationed at this gate may acquire receipt identifier data stored in the IC tag 1510 of the rewritable paper 1500 via the printer 140 (step S11-1). Then, the computer terminal 130 acquires guidance data for guiding the carrier to the next gate from the host computer 120 based on the acquired receipt identifier data (step S11-2), and reversibly prints factory site guidance information 1610 or warehouse guidance information 1620 (step S11-3).

Presently, with the development of car navigation systems, appropriate guidance information may be provided for reaching a given destination within public roads. However, such systems cannot provide guidance information within privately owned property such as a factory site. According to an embodiment described above, the carrier may be accurately guided to a given destination via the guidance printed on the rewritable paper 1500.

According to an embodiment, the host computer 120 acquires guidance information to the next gate each time the carrier reaches a given gate. In this way, the host computer 120 may keep track of the carry-in progress of the carrier via the gates to thereby manage the carry-in process. For example, the host computer 120 may conduct delivery inspection for checking whether products that are not ordered are being carried-in. Also, it is noted that by abstaining from providing information other than that for guiding the carrier to the next gate, and erasing previously provided information in a case where new information is to be provided, for example, information leakage may be prevented and security measures may be tightened.

According to an embodiment described above, the host computer 120 acquires the receipt identifier and the carrier identifier stored in the IC tag 1510 of the rewritable paper 1500 from the computer terminal 130 of a gate. Then, the host computer 120 determines whether the carrier identifier data registered in the carry-in schedule data 1220 including the acquired receipt identifier data correspond to the acquired carrier identifier data. In this way, the host computer 120 may verify the carrier carrying in products, and manage the entering/exit of carriers in/out of a site such as a factory to thereby tighten security measures.

According to an embodiment described above, the host computer 120 compares data received from the computer terminal 130 with the receipt schedule data 1220 to determine whether the data correspond (step S12-2). When the data do not correspond, error output is performed (step S12-3). For example, in a case where the carrier is different from the designated carrier, the host computer 120 may display a warning. In another example, when the current location gate is different from the designated destination gate, the host computer 120 may reversibly display guidance for guiding the carrier to the correct gate. In this way, a receipt error may be detected and corrected.

According to an embodiment described above, the carrier action history level is stored in association with the carrier identifier data in the carrier data storage unit 123. In turn, guidance information according to the carrier action history level may be stored in the guidance data storage unit 124. In this way, the host computer 120 may acquire the carrier action history level of a carrier from the carrier identifier data acquired from the rewritable paper 1500, and provide guidance information according to the acquired carrier action history level of the carrier. For example, if the carrier is not accustomed to the present site and procedures, detailed guidance may be provided in order to facilitate the carry-in operation and reduce the processing time required for completing the operation. On the other hand, if the carrier is familiar with the site and procedures, guidance information may be provided to this carrier accordingly.

According to an embodiment described above, guidance information according to the priority level of the receipt of products is stored in the guidance data storage unit 124. Thereby, in a case where the priority level of the receipt of products is high, guidance for carrying in the products with priority is reversibly printed so that the products may be quickly carried in. In this way, efficiency may be realized in the receipt of products being carried in.

According to an embodiment described above, the host computer 120 outputs a standby command (step S12-7) upon determining that the present products cannot be carried in based on data pertaining to the prioritized receipt identifier or the carry-in time registered in the carry-in schedule data 1220 (step S12-6, NO). In this way, products may be efficiently carried in according to a pre-designated order.

According to an embodiment described above, the host computer 120 determines the priority level based on the carry-in schedule data 1220 stored in the carry-in schedule data storage unit 122 (step S12-4), and adjusts the contents to be reversibly displayed on the rewritable paper 1500 based on the priority level. For example, when a change occurs in the carry-in order of products or the priority level, data stored in the carry-in schedule data storage unit 122 may be changed accordingly so that a command that is to be issued in response to such change may be output to the rewritable paper 1500. In this way, a command may be quickly issued in response to a change.

Second Embodiment

In the following, a second embodiment of the present invention is described with reference to FIGS. 16 through 20. It is noted that elements that are identical to those illustrated in relation to the first embodiment are given the same reference numerals and their descriptions are omitted. The present embodiment is applied to a case of guiding a patient (user) that is to take plural examinations (action) in a medical examination center, for example.

Figure 16:
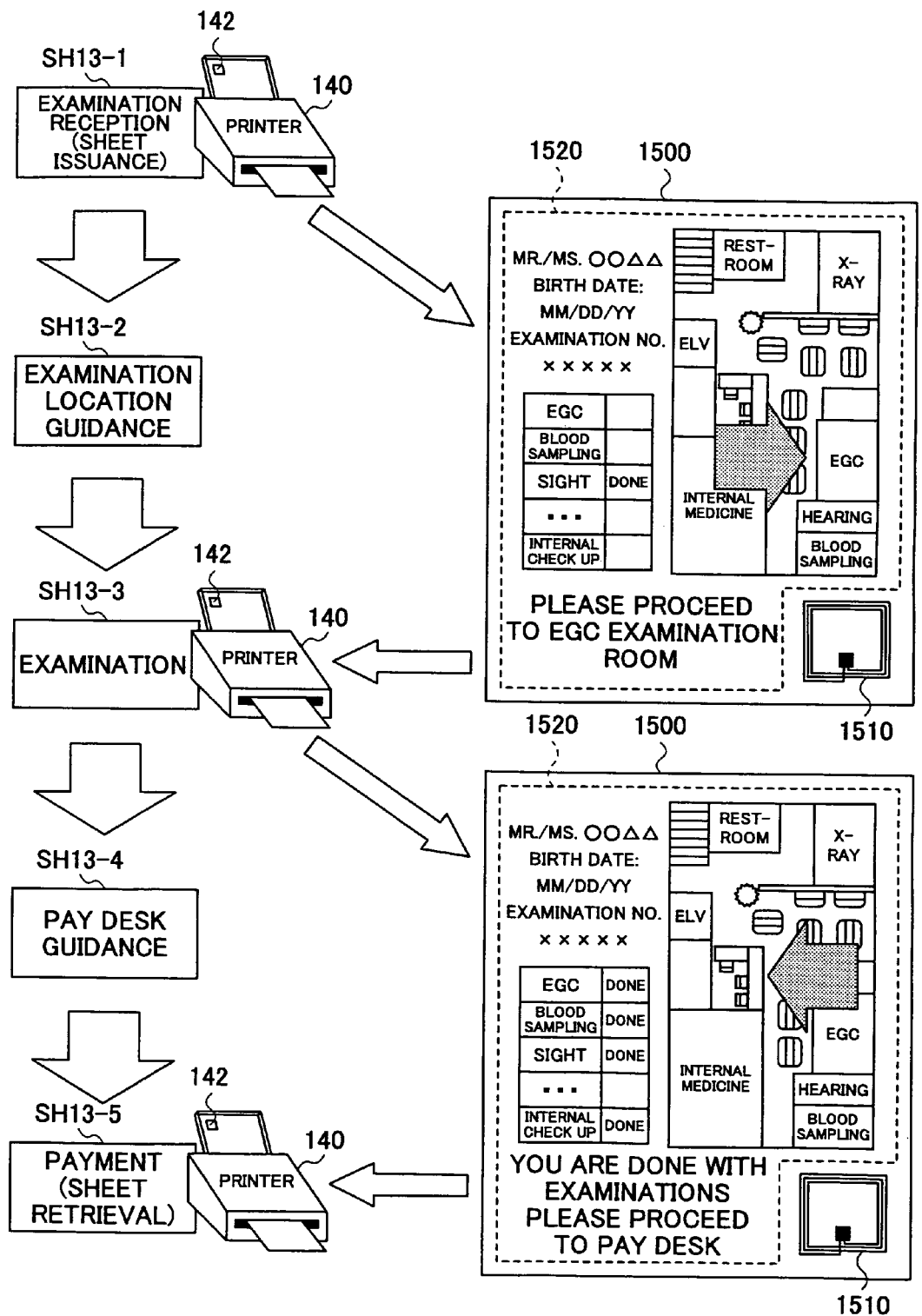
FIG. 16 is a diagram illustrating a general process flow for providing medical examination guidance according to another embodiment of the present invention.

It is noted that the system as is illustrated in FIG. 8 may be used in the present embodiment. Referring to FIG. 16, in the present embodiment, the rewritable paper 1500 is issued in the form of a sheet to be handed to a patient at a medical examination center reception (SH13-1). In this way, the patient is guided to an examination location by the rewritable paper 1500 (SH13-2). Upon reaching the checkup location, the patient is examined (SH13-3). Then, when all examinations are completed, the patient is guided to a pay desk by the rewritable paper 1500 (SH13-4). At the pay desk, payment is made for the medical examinations and the rewritable paper 1500 is retrieved (SH13-5).

In the present embodiment, the patient carries the rewritable paper 1500 throughout the time from being received at the reception to reaching the pay desk. It is noted that the ROM area 1512 of the IC tag 1510 of the rewritable paper 1500 stores data unique to the rewritable paper 1500 (unique medium identifier data) as identification information for identifying this rewritable paper 1500. Also, it is noted that in the present embodiment, no data are stored in the RAM area 1513 of the IC tag 1510. According to the present embodiment, the unique medium identifier data correspond to action determining data and user data.

It is noted that a medical examination center may include a reception, a checkup room, an examination room, and a pay desk, for example. These locations may be used as nodes that are stopped over by the patient. At each of the nodes, a computer terminal 130 and a printer 140 connected to this computer terminal 130 are provided as in the first embodiment.

The printer 140 has a configuration identical to that of the first embodiment (see FIG. 12), and includes a control unit 141, an IC tag communication unit 142, a reversible print processing unit 143, and a network communication unit 144. The computer terminal 130, which realizes data transmission/reception with the printer 140, is configured to transmit/receive data to/from the printer 140 to acquire data stored in the rewritable paper 1500 and/or store data in the rewritable paper 1500 via the printer 140. Also, the computer terminal 130 stores identifier data for identifying the node set at the current location (current location node identifier data) in association with examination item data pertaining to the examination to be conducted at the node. Also, the computer terminal 130 performs data transmission/reception with a host computer via a network.

The host computer corresponds to a management computer that manages the examination status of the patient. It is noted that the host computer used in the present embodiment is different from the host computer 120 used in the first embodiment in that it does not perform the level determination step and the calculation step. The host computer used in the present embodiment includes a CPU, a RAM, and a ROM and is configured to perform a process including a node determination step, an acquisition step, and an output step, for example (details of which are described below). To perform such a process the host computer executes a guidance program so that it may function as a node determination unit, an acquisition unit, and an output unit, for example.

The node determination unit is configured to acquire identifier data stored in the IC tag 510 of the rewritable paper 500 via the computer terminal 130 and the printer 140 making up the node terminal, and determine the next examination location to which the patient is to proceed from a patient data storage unit 182 described below based on the acquired identifier data.

The acquisition unit is configured to acquire guidance data for guiding the patient from the node at which the present printer 140 is set to the next node (location) from a guidance data storage unit 183. The output unit is configured to output the acquired guidance data and control the rewritable display area 1520 of the rewritable paper 1500 to display information corresponding to the acquired guidance data via the computer terminal 130 and the printer 140. Also, the output unit is configured to erase information reversibly displayed at the rewritable display area 1520 of the rewritable paper 1500 to control the rewritable display area 1520 to reversibly display information corresponding to the acquired guidance data.

Also, the host computer used in the present embodiment is connected to an examination item schedule storage unit, a patient data storage unit 182 (as an action schedule storage unit), and a guidance data storage unit 183.

The examination item schedule storage unit stores data pertaining to examination items that are to be taken by the patient in accordance with a corresponding medical examination course. The data includes the medical examination course name associated with plural examination items. For example, data including the examination course name 'COMPLETE PHYSICAL EXAMINATION' may be associated with examination items such as 'CHEST X RAY', 'EGC' (electrocardiogram), 'INTERNAL CHECKUP', 'BLOOD SAMPLING', and 'URINE ANALYSIS', for example.

Figure 17:
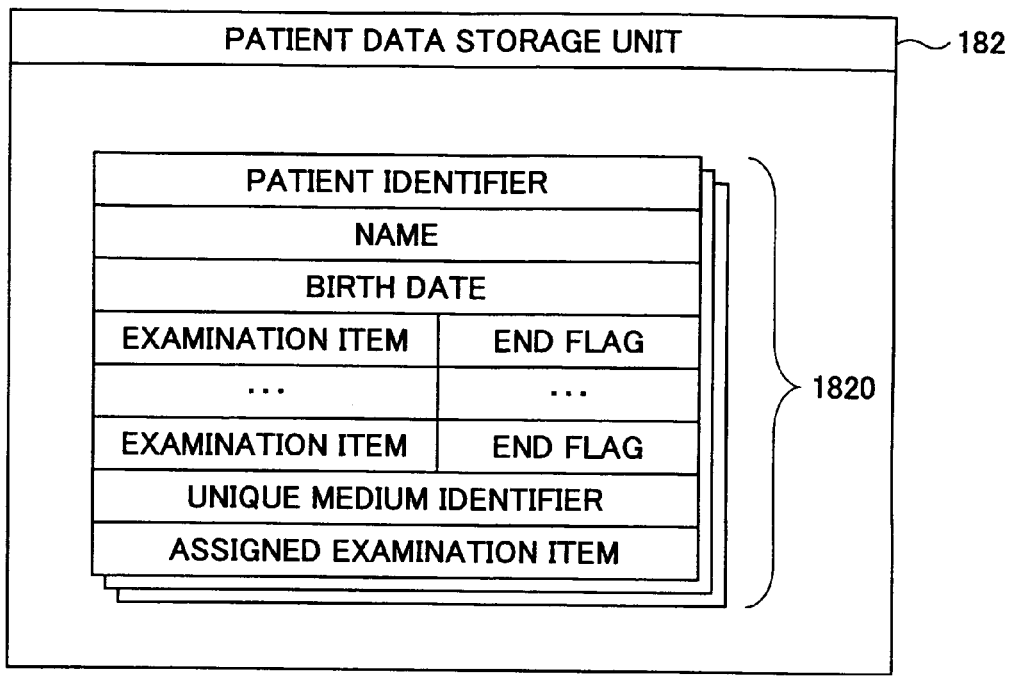
FIG. 17 is a diagram illustrating a configuration of data stored in a patient data storage unit.

The patient data storage unit 182 stores patient data 1820 as action schedule data (see FIG. 17). The patient data 1820 for a patient are set when the patient signs up for a medical examination. The patient data 1820 may include data pertaining to a patient identifier, a name, a birth date, examination items, end flags, a unique medium identifier, and assigned examination items, for example.

In a patient data identifier data area, data pertaining to an identifier for identifying the patient are stored.

In a name data area, data pertaining to the name of the patient are stored.

In a birth date data area, data pertaining to the birth date of the patient are stored.

In an examination item data area, data pertaining to the examination items that the patient plans to take are stored. In this data area, a number of data entries corresponding to the number of examinations and tests the patient is to take are stored.

In an end flag data area, data signifying that examination corresponding to an examination item has been completed are stored. In other words, when an end flag is not stored in the end flag data area for a particular examination item, this signifies that the patient has not undergone the examination corresponding to this examination item.

In a unique medium identifier data area, unique medium identifier data for identifying the rewritable paper 1500 used by the patient are stored. The unique medium identifier data matches the data stored in the ROM area 1512 of the rewritable paper 1500.

In an assigned examination item data area, data pertaining to the examination item currently assigned for the patient are stored. Accordingly, the examination item the patient is currently waiting to take may be determined based on the assigned examination item data.

Figure 18:
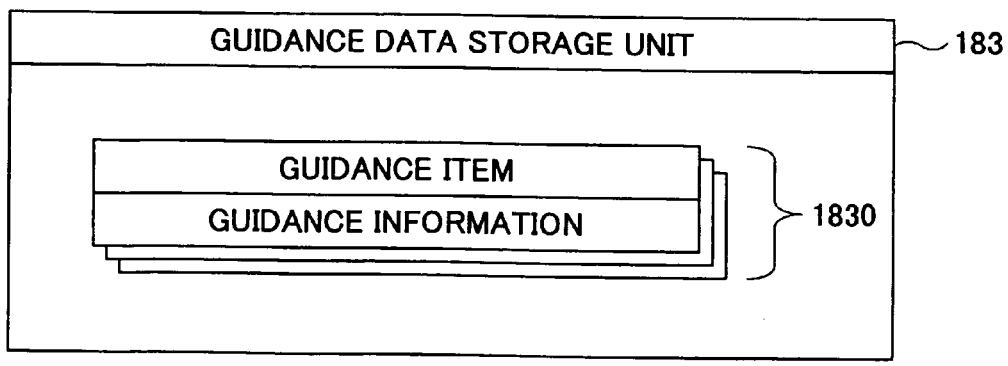
FIG. 18 is a diagram illustrating a configuration of data stored in a guidance data storage unit.

The guidance data storage unit 83 stores guidance data 1830 (see FIG. 18). The guidance data 1830 corresponds to data for guiding the patient to nodes within the medical center. The guidance data 1830 includes data pertaining to guidance items representing guidance locations and guidance information for guiding the patient to the respective guidance locations. According to the present embodiment, the guidance items include data representing examination items and the pay desk. The guidance information includes information for guiding the patient to the guidance locations corresponding to the respective examination items. For example, the guidance information may include a display screen showing a map and the guidance location.

In the following, process steps for conducting examination using the rewritable paper 1500 and the printer 140 in accordance with the general flow illustrated in FIG. 16 are described.

Figure 19:
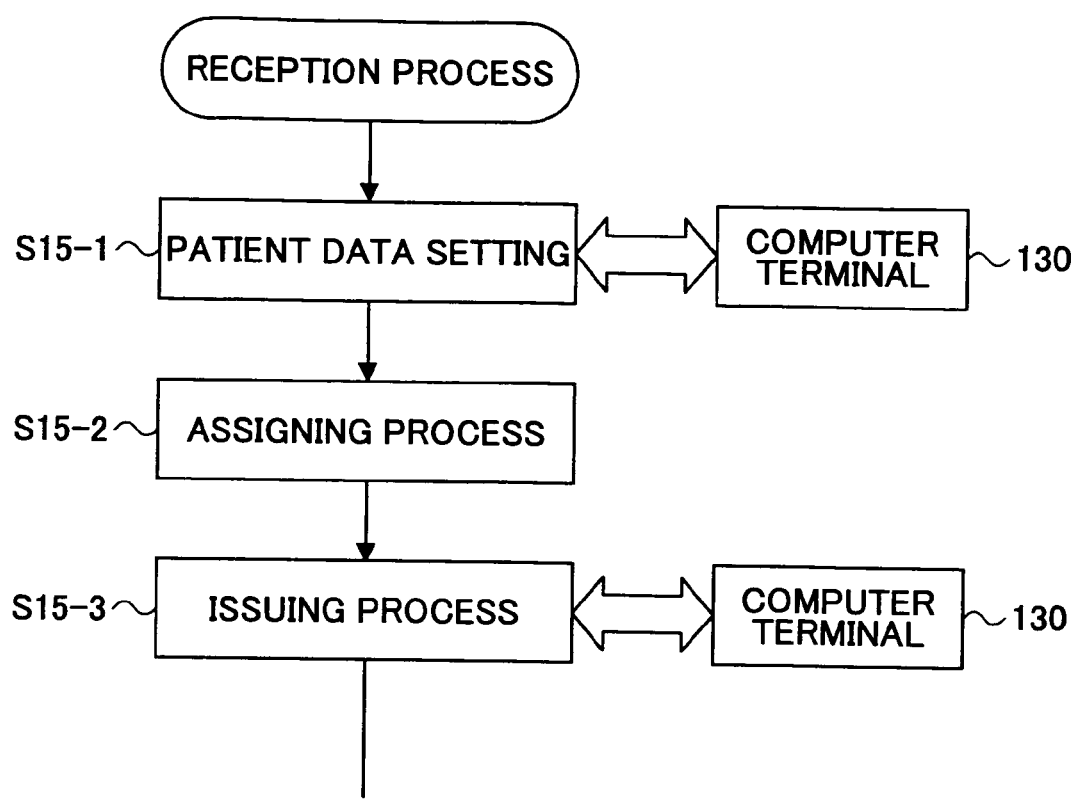
FIG. 19 is a flowchart illustrating steps of a reception process that is performed in the present embodiment.

First, a reception process according to an embodiment of the present invention is described with reference to FIG. 19. In the present embodiment, patient data are generated when the patient signs up for a medical examination at the reception (step S15-1). Specifically, data pertaining to the patient are input via the computer terminal 130 installed at the reception, and the input data are transmitted to the host computer via a network. It is noted that data pertaining to the patient may include data pertaining to the name and birth date of the patient as well as the medical examination course the patient has signed up for. The host computer registers the received data pertaining to the patient in the patient data storage unit 82. Specifically, the host computer registers the name and birth date of the patient. Also, the host computer acquires data pertaining to the examination items the patient is to take from the examination item schedule storage unit based on the received data pertaining to the medical examination course, and registers the acquired data as patient data 1820.

Then, the host computer performs an assigning process (step S15-2). Specifically, the host computer performs a counting process on the assigned examination item data stored in the patient data storage unit 82 to determine the number of assigned examination item data entries for each examination item. Then, the host computer extracts the examination item with the least number of patients assigned to take the corresponding examination, and designates the extracted examination item as the assigned examination item for the present patient. It is noted that in a case where plural examination items with the least number of patients are extracted, the host computer may designate the assigned examination item in accordance with the order in which the examination items are listed in the patient data storage unit 182, for example. Then, the host computer registers data indicating the examination item designated as the assigned examination item as assigned examination item data in the patient data 1820.

Then, the host computer performs an issuing process (step S15-3). In this process, the host computer performs a printing process on the rewritable paper 1500. Specifically, the host computer transmits the patient data 1820 and data pertaining to guidance information for the guidance item representing the assigned examination item to the computer terminal 130 installed at the reception as print data. In turn, the computer terminal 130 controls the printer 140 to print the print data on the rewritable paper 1500 inserted into the printer 140. Accordingly, the printer 140 prints the name, birth date, patient identification number, examination items, and guidance information on the rewritable display area 1520 of the rewritable paper 500 as is shown in FIG. 16. It is noted that in the example of FIG. 16, the guidance information includes a guide map of examination locations and information indicating an examination location within the map.

Then, the host computer reads the unique medium identifier data from the ROM area 1512 of the rewritable paper 1500 inserted into the printer 140, and registers the read data in the patient data 1820 of the patient data storage unit 182. Then, the printer 140 discharges the rewritable paper 1500. In this way, the reception process is completed.

The patient receives the issued rewritable paper 1500 and proceeds to an examination location by referring to the rewritable paper 1500. Upon reaching the examination location (node), the patient inserts the rewritable paper 1500 into the printer 140 stationed at this examination location. In this way, a node reception process similar to the gate reception process described in relation to the first embodiment of the present invention is performed, and an examination guidance managing process is performed.

Specifically, as is shown in FIG. 14, the computer terminal 130 connected to the printer 140 having the rewritable paper 1500 inserted therein reads the unique medium identifier data from the IC tag 1510 of the rewritable paper 1500 (step S11-1). Then, the computer terminal 130 transmits the read unique medium identifier data and the examination item data representing the node identifier of the current location node to the host computer.

Figure 20:
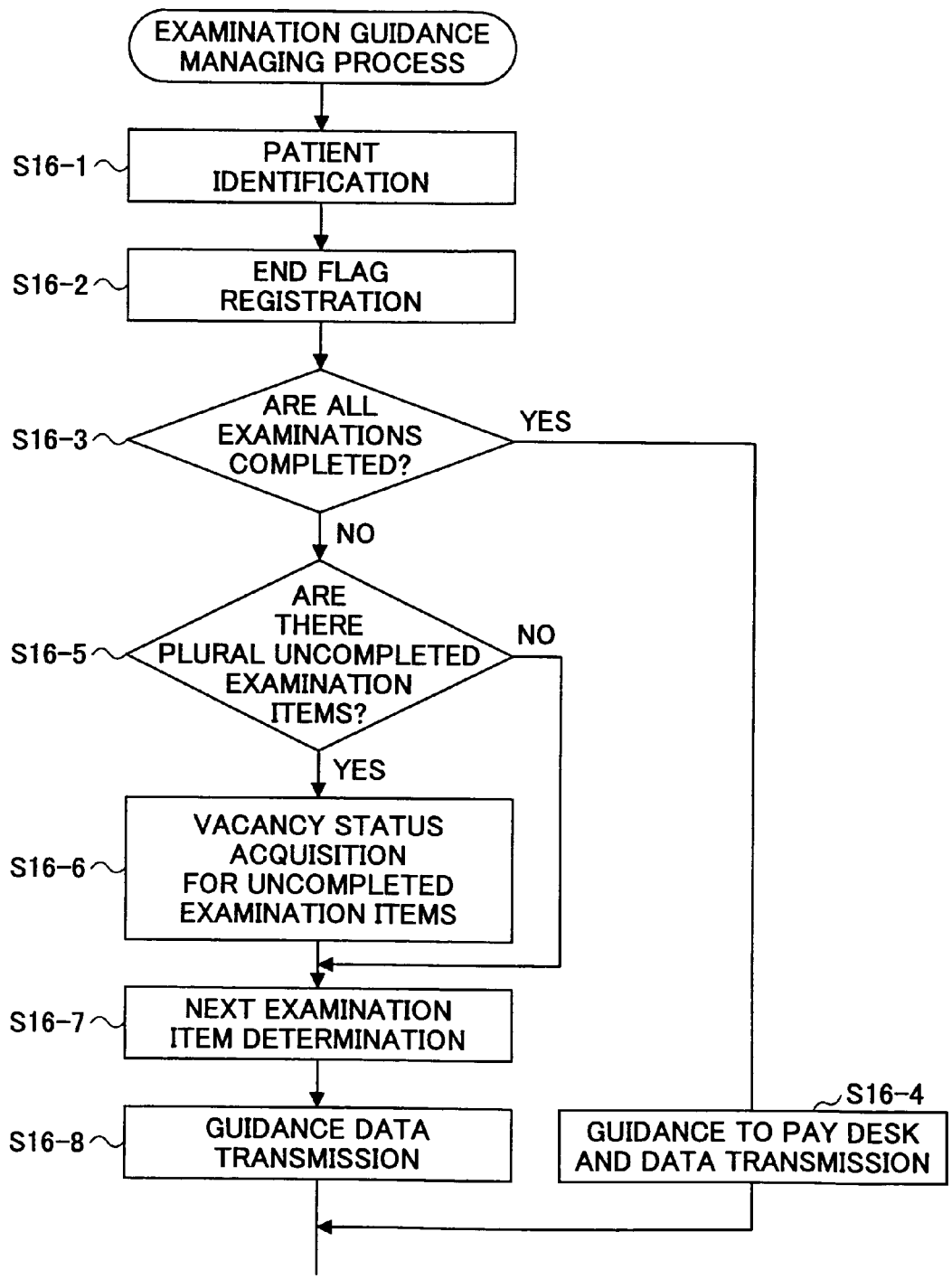
FIG. 20 is a flowchart illustrating steps of an examination guidance managing process that is performed in the present embodiment.

In turn, the host computer performs the examination guidance managing process as is shown in FIG. 20. Specifically, upon receiving the read unique medium identifier data from the computer terminal 130, the host computer identifies the patient based on the received data (step S16-1). In this step, the host computer extracts patient data 1820 including unique medium identifier data corresponding to the received unique medium identifier data from the patient data storage unit 182.

Then, the host computer registers an end flag in the identified patient data 1820 (step S16-2). Specifically, the host computer registers an end flag in association with the examination item data included in the data received from the computer terminal 130 in the patient data 1820 for the identified patient. Then, the host computer determines whether all the examinations to be taken by the patient have been completed (step S16-3). Specifically, the host computer determines whether end flags are registered for all the examination items registered in the patient data 1820 for the patient.

In a case where the end flags are registered for all the examination items, the host computer determines that the examinations have been completed (step S16-3, YES), and transmits guidance data for guiding the patient to the pay desk (step S16-4). Specifically, the host computer erases the assigned examination items registered in the patient data 1820. Then, the host computer extracts guidance information for guiding the patient to the pay desk from the guidance data 1830, and transmits data pertaining to the extracted guidance information to the computer terminal 130 via a network.

On the other hand, in a case where there are examination items for which end flags are not yet registered and the examinations are not yet completed (step S16-3, NO), the host computer determines whether there are plural uncompleted examination items (step S16-5). Specifically, the host computer determines whether there are two or more uncompleted examination items for which end flags are not yet registered.

In a case where two or more uncompleted examination items exist (step S16-5, YES), the host computer acquires vacancy statuses of the uncompleted examination items (step S16-6). Specifically, the host computer performs a counting process on the assigned examination item data of the patient data 1820 stored in the patient data storage unit 182 to determine the number of assigned examination item data entries for each examination item.

Then, the host computer determines the next examination item (step S16-7). Specifically, out of the uncompleted examination items for the present patient, the host computer determines the examination item with the least number of patients as the next examination item. It is noted that in a case where there is only one uncompleted examination item (step S16-5, NO), this uncompleted examination item is designated as the next examination item.

After the next examination item is determined, the host computer overwrites data representing the next examination item on the patient data 1820 as assigned examination item data to thereby update the patient data 1820.

Then, the host computer transmits the guidance data (step S16-8). Specifically, the host computer extracts guidance information corresponding to the examination item registered as the assigned examination item data of the patient data 1820 from the guidance data 1830, and transmits data pertaining to this guidance information to the computer terminal 130 via a network.

As is described above, the computer terminal 130 receives the guidance data transmitted from the host computer to thereby acquire the guidance data (step S11-2 of FIG. 14). In this way, the examination guidance managing process performed by the host computer is completed.

Then, the computer terminal 130 performs a reversible printing process (step S11-3). Specifically, the computer terminal 130 generates reversible print data corresponding to the guidance data acquired in step S11-2, and transmits the generated reversible print data to the printer 140. In turn, the control unit 141 of the printer 140 controls the reversible print processing unit 143 to perform a reversible print process based on the reversible print data.

In this case, the control unit 141 of the printer 140 erases the reversible display (examination items and guide map information in the illustrated embodiment) printed on the rewritable display area 1520 of the rewritable paper 1500, and prints new information. In the present embodiment, examination items including one or more items with markers 'DONE' attached thereto indicating that the corresponding examinations have been completed and guidance information providing guidance to the next examination location are printed as new information. In this way, the patient may check the examination items that have been completed and the next examination location by looking at the rewritable paper 1500 with the new information printed thereon. It is noted that in the present embodiment, the control unit 141 of the printer 140 does not perform updating of the IC tag memory 1510 as in the first embodiment. In this way, the rewritable paper 1500 is rewritten and the node reception process is completed.

After all the examinations are conducted on the patient and the patient is guided to the pay desk, the patient inserts the rewritable paper 1500 into the printer 140 stationed at the pay desk. In this way, the computer terminal 130 connected to this printer 140 may read the unique medium identifier data from the IC tag 1510 of the rewritable paper 1500 via the printer 140 and transmit the read data to the host computer. In turn, the host computer extracts patient data with unique medium identifier data matching the received unique medium identifier data and identifies the patient that has reached the pay desk. Then, the host computer confirms that all examinations have been conducted on the patient and performs a process pertaining to payment.

In the following, advantageous effects that may be achieved by one or more of the above embodiments are described.

According to an embodiment described above, upon reaching an examination location, a patient inserts the rewritable paper 1500 into the printer 140 stationed at this examination location. In turn, the computer terminal 130 reads the unique medium identifier data of the rewritable paper 1500 from the IC tag 1510 of the rewritable paper 1500 via the printer 140 (step S11-1). Then, the computer terminal 130 acquires from the host computer guidance data for guiding the patient to the next examination location based on the acquired unique medium identifier data (step S11-2), and reversibly prints examination items and guide map information (step S11-3). With the guidance information printed on the rewritable paper 1500, the patient may be properly guided to a designated examination location within a medical examination center; namely, a destination within a building.

Also, after a given examination is conducted on the patient, the host computer determines the next examination item (step S16-7) and provides guidance to the corresponding examination location. In this case, the host computer overwrites data representing the determined examination item on the patient data 1820 as assigned examination item data to thereby update the patient data 1820. Accordingly, the host computer may determine the vacancy statuses of uncompleted examination items based on the assigned examination item data of the patient data 182, and thereby, when a given examination of the patient is completed, the host computer may guide the patient to the next examination that is currently vacant. In this way, examinations may be conducted on the patient in an efficient manner.

According to an embodiment described above, when a given examination is completed, the computer terminal 130 uses the printer 140 to display the corresponding examination item with a marker 'DONE' attached thereto on the rewritable paper 1500. In this way, the patient may check the examination items that have been completed by referring to the rewritable paper 1500.

According to an embodiment described above, in a first step of the reception process, the patient data are set (step S15-1). In this case, the host computer acquires data pertaining to the examination items to be conducted on the patient from the examination item schedule storage unit based on data pertaining to a designated medical examination course and registers the acquired data as patient data 1820. Also, the host computer successively attaches end flags to examination items of which corresponding examinations have been completed. In this way, clerical errors in writing down the relevant examination items for a patient may be avoided, and all the relevant examination items may be conducted on the patient with greater reliability.

In the following, modifications that may be applied to one or more of the above embodiments are described.

According to an embodiment described above, the rewritable display area 1520 includes a reversible thermo-sensitive recording medium such as a thermo-chromatic film; however, the present invention is not limited to such an embodiment. For example, a display medium capable of electrically or optically rewriting visual information may be used as well.

According to an embodiment described above, the rewritable paper 1500 includes the IC tag 1510 and the antenna unit 1514 for realizing non-contact data transmission/reception with respect to the printer 140; however, the present invention is not limited to such an embodiment, and any type of memory may be used that is capable of storing print content data reversibly displayed at the rewritable paper 1500. For example, the rewritable paper 1500 may include a contact-type data storage unit (e.g., an IC chip or a magnetic tape including an electrode pad). Also, it is noted that two dimensional code may be printed so as to record original print content data, for example.

According to an embodiment described above, a printer 140 that reads/writes data from/on the rewritable paper 1500 and a computer terminal 130 connected to this printer 140 that realizes data transmission/reception with the host computer 120 are set to each gate; however, the present invention is not limited to such an embodiment. For example, the printer 140 may be provided with the functions of the terminal computer 130. In such a case, the printer 140 may be configured to realize data transmission/reception with the host computer 120 via the network communication unit 144, and the computer terminal 130 may be unnecessary.

Figure 21:
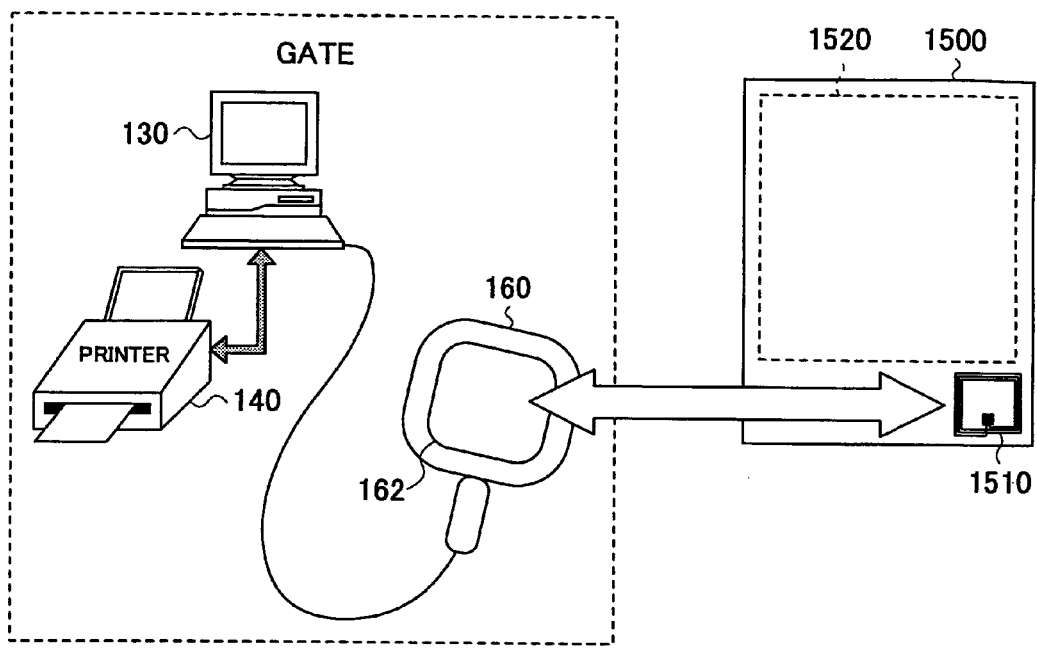
FIG. 21 is a diagram illustrating data transmission/reception means of a node terminal according to a first modification example.
Figure 22:
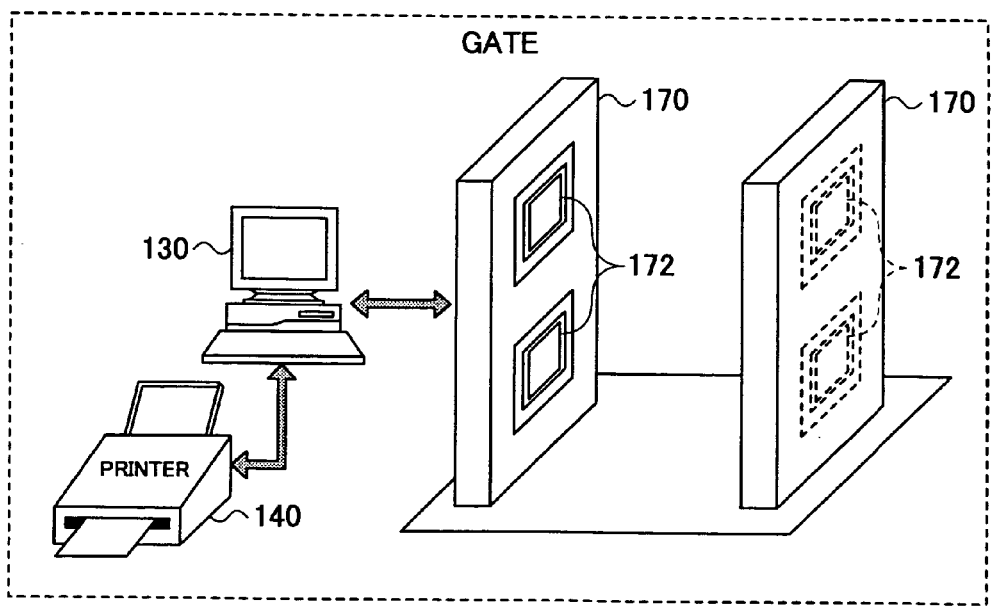
FIG. 22 is a diagram illustrating data transmission/reception means of a node terminal according to a second modification example.

According to an embodiment described above, the IC tag communication unit 142 is arranged within the printer 140 as data transmission/reception means of the node terminal. However, the present invention is not limited to such an embodiment, and for example, as is shown in FIG. 21, a handy scanner 160 that is connected to the computer terminal 130 may be used as the data transmission/reception means of the node terminal. The handy scanner 160 includes an antenna 162 for establishing communication with the IC tag 1510. In another example, as is shown in FIG. 22, antennas 172 arranged at support walls 170 corresponding to the entrance/exit of a gate may be connected to the computer terminal 130 to realize the data transmission/reception means of the node terminal. In the second embodiment, the antennas 172 may be arranged at the entrance/exit of the examination rooms, for example.

In another modified embodiment, plural types of data transmission/reception means may be used. For example, the antennas 172 may be arranged at the support walls 170 corresponding to the entrance/exit of a gate, the printer 140 may include the IC tag communication unit 142, and both the antennas 172 and the IC communication tag unit 142 may be connected to the computer terminal 130. In such a case, when data stored in the IC tag 1510 of the rewritable paper 1500 are successfully read via the antennas 172 upon passing through the support walls 170, the computer terminal 130 acquires guidance data based on the read data. When data stored in the IC tag 1510 are not successfully acquired via the antennas 172, the computer terminal 130 reads the data of the IC tag 1510 via the IC tag communication unit 142 of the printer 140. In this way acquisition of the data stored in the IC tag 1510 may be further ensured so that accurate guidance may be properly provided to a user.

According to an embodiment described above, the unique medium identifier data stored in the ROM area 1512 of the IC tag 1510 of the rewritable paper 1500 are used as the action determining data and the user data. Specifically, the host computer identifies a patient based on the unique medium identifier data. However, the present invention is not limited to such an embodiment, and for example, patient identifier data may be used as the action determining data and the user data. In this case, in the issuing process (step S15-3), the host computer stores data pertaining to the patient identifier of the patient for whom the rewritable paper 1500 is being issued in the RAM area 1513 of the IC tag 1510. Accordingly, a computer terminal 130 at an examination location (node) may acquire the patient identifier data stored in the RAM area 1513 via the printer 140, and transmit the acquired data to the host computer. In turn, the host computer may identify the patient from the patient data storage unit 182 based on the patient identifier data.

According to an embodiment described above, guidance information associated with guidance items is stored as the guidance data 1830. However the present invention is not limited to such an embodiment, and for example, the guidance data 1830 may represent guidance information associated with guidance items as well as the corresponding levels of patients (users). Specifically, a level of a patient may be determined according to the action history of the patient (e.g., being examined for the first time, examined less than half a year ago, examined a few years ago), and guidance information according to the determined level of the patient may be stored as the guidance data 1830. For example, detailed information in addition to map information may be included in the guidance information for a patient being examined for the first time. In this case, the host computer may include a user action history data storage unit for storing data pertaining to a date on which the patient has been examined in the past.

According to an embodiment described above, a guidance management technique is applied to a case of taking plural examinations corresponding to predetermined examination items included in a medical examination course. However, the present invention is not limited to such an embodiment, and may equally be applied to a case of being examined at plural departments in a general hospital, for example. In this case, the host computer may determine the congestion state of each department based on the assigned examination item data (data pertaining to the number of persons guided to each department), and assign the next department at which the patient is to be examined according to the determined congestion state information.

According to an embodiment described above, the host computer determines the examination item with the least number of patients out of the uncompleted examination items for a given patient and assigns the determined examination item as the next examination item for the relevant patient. However, the present invention is not limited to such an embodiment, and for example, the host computer may determine an examination item with smallest estimated waiting time value out of the uncompleted examination items for a given patient and assign the determined examination item as the next examination item for the relevant patient. In this case, the host computer may be connected to a storage unit that stores data pertaining to an estimated examination time value for each of the examination items. The host computer may calculate an estimated waiting time value for each examination item by multiplying the estimated examination time value for each examination item by the counted number of assigned examination item data entries for the examination item. Then, the host computer may determine the examination item with the smallest estimated waiting time value as the next examination item for the relevant patient. In this way, examinations may be conducted on a patient in an efficient manner even when required examination times differ depending on the examination items.

According to an embodiment described above, the host computer registers data pertaining to the assigned examination item in the patient data storage unit 182 when the issuing process (step S15-3) and the examination guidance managing process are performed. In this case, the host computer may also include data pertaining to the assignment time at which the assigned examination item data are registered in the patient data storage unit 182 as the patient data 1820 for a patient. In this way, the host computer may determine the waiting order of patients based on the registered assignment time data.

According to an embodiment described above, a carrier carrying in products to a factory is illustrated as the user subject to guidance. According to another embodiment described above, a patient subject to a medical examination is illustrated as the user. However, the present invention is not limited to such embodiments, and may equally be applied to a case of moving or discarding products within a factory for example. In a case of discarding certain products, special procedures may have to be taken. In such a case, the location(s) at which the special procedures are to be taken may be set as intermediary point gates (nodes), and the user may be guided thereto. Also, the present invention may be applied to a case of guiding a user through a museum or an attraction park, for example. In another example, the present invention may be applied to a case of guiding an outsider within an area having strict security measures imposed therein. In this case, the outsider may be arranged to carry a rewritable paper as a pass, and insert the rewritable paper in a printer installed at a gate so as to be guided through a designated route to reach a destination point.

In the following, further technical features of the present invention that may be appreciated from one or more of the above-illustrated embodiments and modifications are described.

(a) In one preferred embodiment of the guidance managing method according to the present invention, the management computer is connected to a guided node determination storage unit for storing data for determining a node to which the user is guided as the next destination node;

the action schedule storage unit stores data pertaining to a node to be stopped over by the user;

the management computer executes a head count acquisition process for acquiring the number of users guided to each node based on data stored in the guided node determination storage unit; and the node determining step involves determining the next destination node for the user based on the acquired number of users and the data pertaining to the node to be stopped over by the user stored in the action schedule storage unit.

(b) In one preferred embodiment of the guidance managing program according to the present invention, the management computer is connected to a guided node determination storage unit for storing data for determining a node to which the user is guided as the next destination node;

the action schedule storage unit stores data pertaining to a node to be stopped over by the user;

the management computer executes a head count acquisition process for acquiring the number of users guided to each node based on data stored in the guided node determination storage unit; and the node determining step involves determining the next destination node for the user based on the acquired number of users and the data pertaining to the node to be stopped over by the user stored in the action schedule storage unit.

According to the preferred embodiments described above, a user may be guided to a node to be stopped over by this user in an efficient manner according to the congestion states of the nodes, for example.

[Antenna]

In the following, embodiments of antennas are described that include communication units configured to read/write information from/on an information storage medium attached to an object, the data read/write operation being performed when the object is carried in/out of a specific location, for example.

Figure 23:
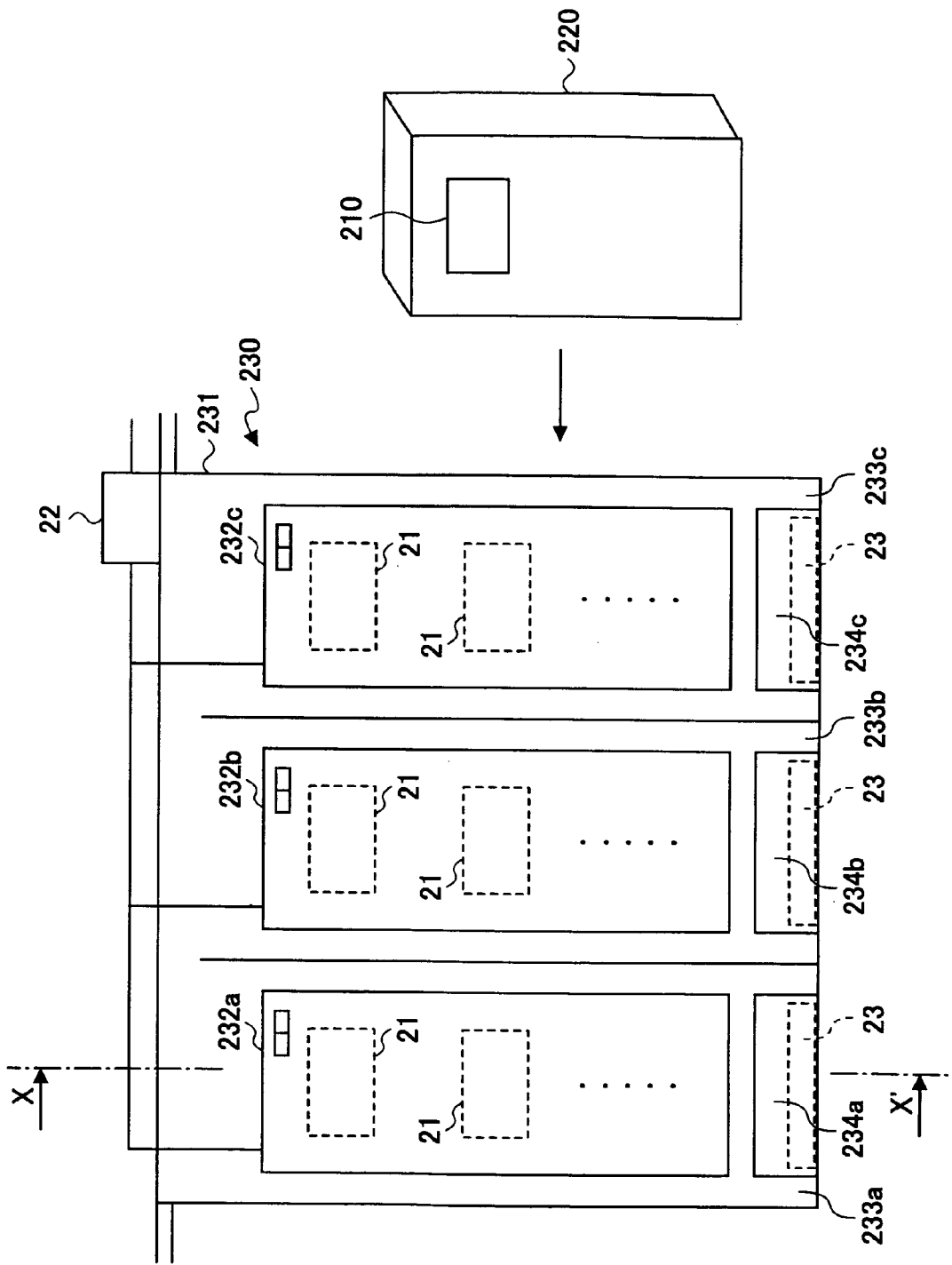
FIG. 23 is a diagram illustrating a configuration of an antenna that may be applied in an embodiment of the present invention.

FIG. 23 is a diagram illustrating an antenna 230 according to one embodiment. The antenna 230 according to the present embodiment establishes communication with an information storage medium 210 such as a RFID (Radio Frequency Identification) tag that is attached to an object 220. The antenna 230 includes a sheet member 231 that is arranged into a flapping-curtain-like structure, communication units 21, for establishing communication with the information storage unit 210 via radio waves, and a control unit 22 for controlling the communication units 21. The sheet member 231 may be made of a flexible plastic sheet, for example, and has slits that divide the sheet structure into plural rows 233a through 233c at which pouch type accommodating portions 232a through 232c are respectively arranged for detachably accommodating the communication units 21. Also, at the bottom sections of the rows 233a through 233c, weight accommodating portions 234a through 234c are respectively arranged for accommodating weight members 23. The antenna 230 hangs in a manner such that it may oscillate when the object 220 comes into contact with the sheet member 231. The antenna 230 is configured to establish communication with the information storage medium 210 attached to the object 220 when this object passes through the antenna 230, and in this way, the antenna 230 reads/writes various forms of information from/on the information storage medium 210.

According to one embodiment, the object 220 may correspond to a product being carried in/out. According to another embodiment, in a case where a rewritable paper is carried along with one or more products being carried in/out, the information storage medium 210 may be attached to the rewritable paper (not shown) so that the antenna 230 may be configured to establish communication with the information storage medium 210 attached to the rewritable paper.

In the illustrated embodiment, the control unit 22 is configured to perform overall transmission/reception control of the communication units 21 accommodated in the accommodating portions 232a through 232c to execute an exclusive process and/or a synchronization process, for example. The accommodating portions 232a through 232c are arranged into pouches that may be opened/closed, and at least one communication unit 21 is accommodated in each of these accommodating portions 232a through 232c (in the illustrated example, two communication units 21 are accommodated in each row). In this way, for example, when a recognition process cannot be properly performed by one of the communication units 21 due to disconnection or breakdown to thereby require replacement operations, the communication unit 21 that fails to perform the recognition process may be replaced.

It is noted that the communication units 21 may be placed in/out of the accommodating portions 232a through 232c. Accordingly, openings including slits (not shown), for example, are arranged at the accommodating portions 232a through 232c. The openings may be sealed by adhesive tape after the communication units 21 are suitably accommodated within the accommodating portions 232a through 232c, for example. In this case, air remains inside the accommodating portions 232a through 232c so that they may function as air cushions that protect the communication units 21 accommodated therein from damage that may be caused by shock and/or pressures exerted from the outside. Also, the accommodating portions 232a through 232c may protect worker(s) and/or the object(s) 220 from the antenna 230 to thereby improve operations security.

The communication unit 21 is detachably mounted on the sheet member 231 by means of a fastening member 24 (see FIGS. 24 through 26) corresponding to double faced tape or a hook and loop fastener such as magic tape (registered trademark), for example. With such an arrangement, the mounting positions of the communication units 21 may be adjusted according to the size and shape of the object 220. It is noted that a hook and loop fastener is preferably used to enable the communication units 21 to be detached from the sheet member 231 as is necessary or desired so that adjustment of the mounting positions of the communication units 21 may be facilitated. As can be appreciated from the above descriptions, in the antenna 230 according to the present embodiment, the mounting positions of the communication units 21 may be adjusted, and therefore, communication with the information storage medium 210 may be ensured and performance of information read/write processes may be improved.

In a case of placing the antenna 230 (sheet member 231) at a carry-in entrance of a factory, for example, the antenna 230 may define the boundary between the interior and exterior of the factory. In such a case, when the sheet member 231 flaps up, dust and other foreign substances may enter the factory to thereby cause pollution within the factory. Accordingly, weight members 23 are arranged at the bottom sections of the sheet member 231 in order to prevent the sheet member 231 from flapping up. It is noted that water, sand, rubber, gel, urethane, silicon rubber, shock absorbing material, or magnets may be used as the weight members 23, for example. In the case of using magnets as the weight members 23, magnets or magnetic material are arranged at floor surfaces opposing the weight members 23. In this way, the sheet member 231 may be securely held in position so that it may be prevented from flapping due to wind blowing from the outside, for example.

It is noted that the object 220 may be protected by a wrapping stretch film, for example. In such a case, when the object 220 wrapped in the stretch film passes through the antenna 230 a blocking effect may occur between the stretch film covering the object 220 and the sheet member 231 (i.e., the surfaces of the stretch film and the sheet member 231 may be adhered to each other). In the following, exemplary measures implemented in the antenna 230 for preventing the occurrence of such a blocking effect are described.

(1) Matt processing or $SiO_2$ (silica) filler processing may be performed, for example, in order to arrange the surface of the sheet member 231 into a concavo-convex surface.

(2) The friction coefficient of the surface of the sheet member 231 is arranged to be less than or equal to a predetermined value. For example, silicon coating or fluorine coating may be performed. The friction coefficient of the surface of the sheet member 231 may be set to a value around 0.5 or lower, for example.

(3) The electrical resistance of the surface of the sheet member 231 is arranged to be within a predetermined range. This corresponds to a countermeasure against static electricity, and the surface electrical resistance may be arranged to be within a range of approximately $10^3$~$10^{13}$ $\Omega/\square$, for example.

By implementing the anti-blocking measures as is described above, the sheet member 231 and the stretch film covering the object 220 may be prevented from being damaged, and a smooth carry-in process may be realized, for example.

Figure 24:
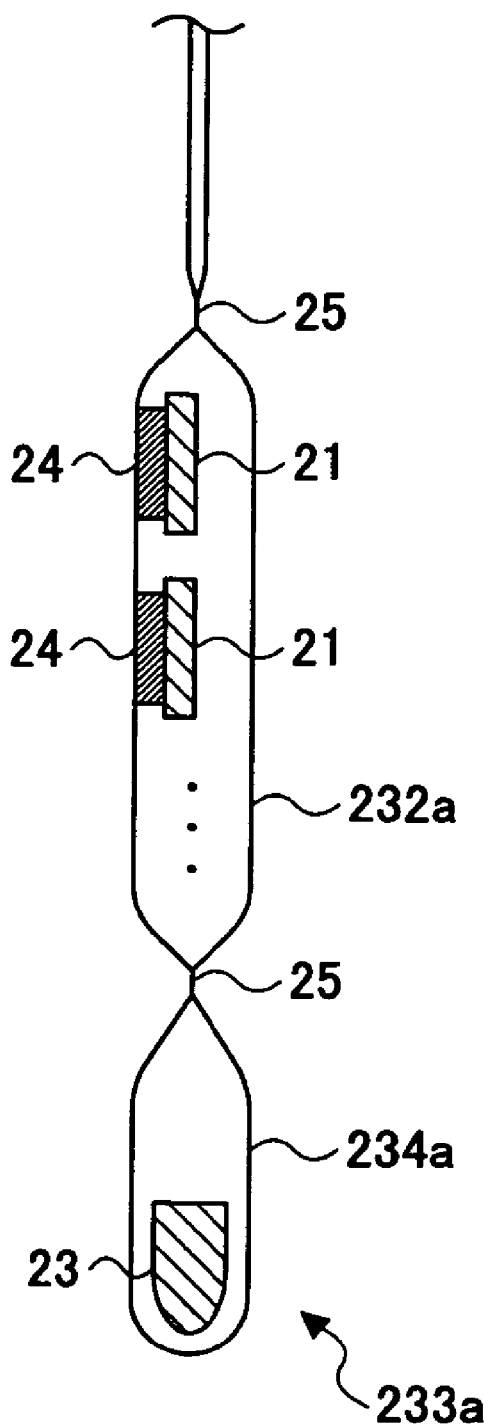
FIG. 24 is an exemplary cross-sectional view of the antenna shown in FIG. 23 cut across line X-X'.

FIG. 24 is an exemplary cross-sectional view of the antenna 230 shown in FIG. 23 cut across X-X' line. It is noted that this drawing illustrates the cross-section of the row 233a of the antenna 230 as a representative example; however, the other rows (i.e., rows 233b and 233c) may also have similar cross-sectional structures. As is shown in FIG. 24, the antenna 230 accommodates the communication units 21 in its accommodating portion 232a and the weight member 23 in its weight accommodating portion 234a. The accommodating portion 232a is arranged into a pouch having a heat-sealed periphery portion (sealed portion 25) sealing the pouch along its upper, lower, left, and right peripheral sides, and includes fastening members 24 for adjustably fastening the communication units 21 to their respective mounting positions. As is described above, double sided tape, or a hook and loop fastener such as magic tape (registered trademark) may be used as the fastening member 24.

It is noted that an opening portion including a slit (not shown) is provided at the accommodating portion 232a so that the communication units 21 may be placed in/out of the accommodating portion 232a as is necessary or desired. After the communication units 21 are accommodated in the accommodating portion 232a, the opening portion may be sealed by adhesive tape, for example. In this case, air remains inside the accommodating portion 232a so that it may function as an air cushion that protects the communication units 21 accommodated therein from damage that may be caused by shock and/or pressures exerted from the outside. Also, the weight member 23 is accommodated in the weight accommodating portion 234a of the antenna 230 in order to prevent the sheet member 231 of the antenna 230 from flapping up.

Figure 25:
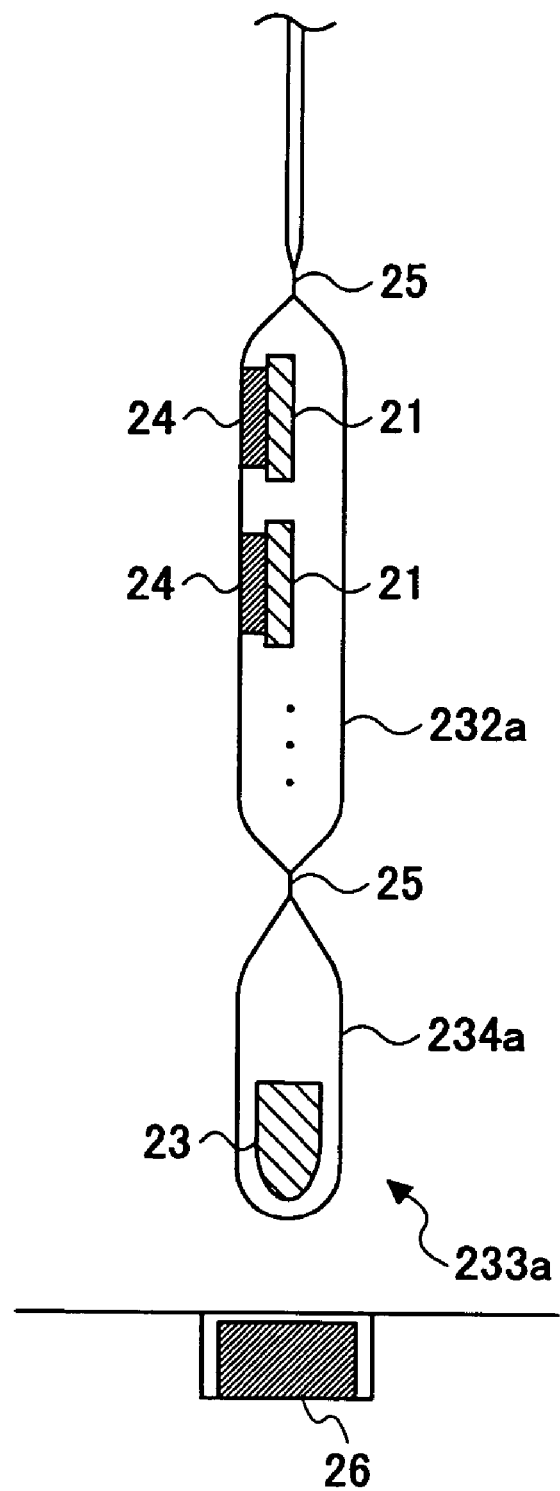
FIG. 25 is another exemplary cross-sectional view of the antenna shown in FIG. 23 cut across line X-X'.

FIG. 25 is another exemplary cross-sectional view of the antenna 230 shown in FIG. 23 cut across line X-X'. It is noted that in this drawing, the cross-section of the row 233a of the antenna 230 is shown as a representative example; however, the other rows (i.e., rows 233b and 233c) may also have similar cross-sectional structures. As is shown in FIG. 25, the antenna 230 accommodates the communication units 21 in its accommodating portion 232a and the weight member 23 in its weight accommodating portion 234a. In the present example, a magnet is used as the weight member 23, and a holding member 26 (e.g., made of a magnet or a magnetic material) is arranged at the opposing floor surface of the weight member 23. In this way, the antenna 230 may be securely held in position, and may be prevented from flapping up even when forces of a wind is exerted on the antenna from the outside, for example.

It is noted that in one embodiment, the weight member 23 may be made of a magnet and the holding member 26 may be made of a magnetic material. In another embodiment, the weight member 23 may be made of a magnetic material and the weight member 26 may be made of a magnet. Also, in one embodiment, the magnet may be an electromagnet. In this case, when an object 220 is not located close by, the switch of the electromagnet may be turned on to thereby induce the antenna 230 to function as a partition board between the interior and exterior of the factory. When sensing the presence of an object 220 located close by through a sensor, for example, the switch of the electromagnet may be turned off to thereby enable the object 220 to pass through the antenna 230 with ease.

Figure 26:
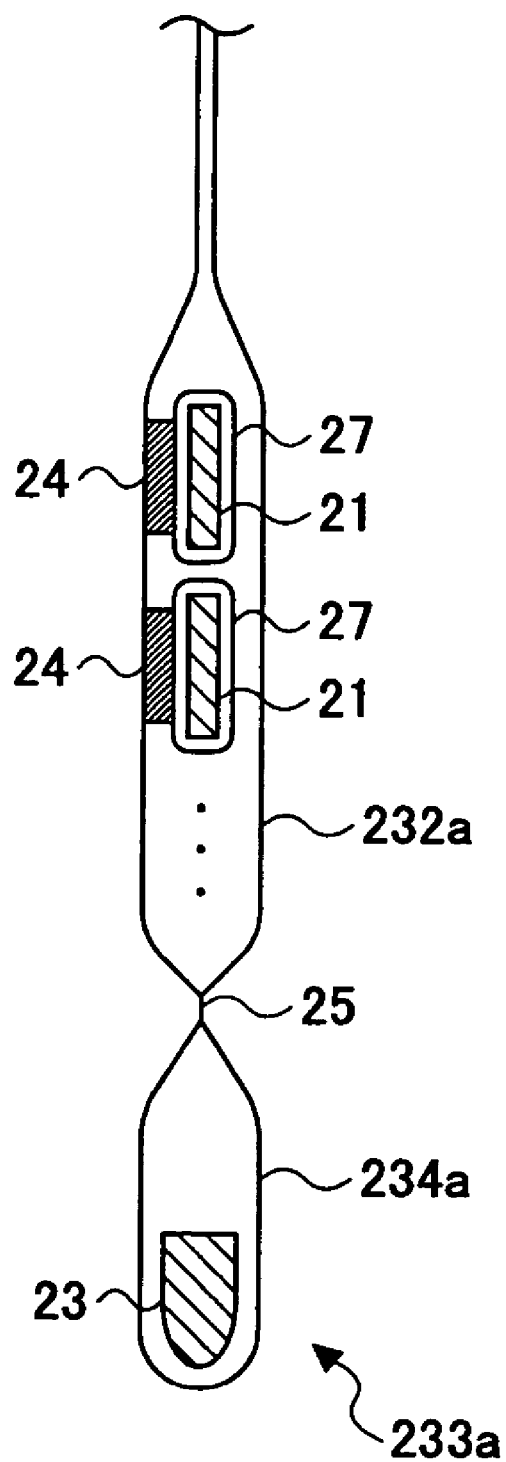
FIG. 26 is another exemplary cross-sectional view of the antenna shown in FIG. 23 cut across line X-X'.

FIG. 26 is another exemplary cross-sectional view of the antenna 230 shown in FIG. 23 cut across line X-X'. In this drawing, the cross-section of the row 233a of the antenna 230 is shown as a representative example; however, the other rows (i.e., rows 233b and 233c) may also have similar cross-sectional structures. As is shown in FIG. 26, the antenna 230 accommodates the communication units 21 in its accommodating portion 232a and the weight member 23 in its weight accommodating portion 234a. In the present example, each of the communication units 21 is covered by a protective member 27. For example, a packaging air mat may be used as the protective member 27. It is noted that when the communication unit 21 is protected by the protective member 27, the accommodating portion 232a does not necessarily have to be closed. In the example shown in FIG. 26, the upper periphery portion of the accommodating portion 232a is not heat sealed. By covering the communication unit 21 with the protective member 27, the communication unit 21 may be protected from damage caused by shock or pressure exerted from the outside. Also, such an arrangement may protect worker(s) and the object(s) 220 so as to improve operations security.

Figure 27:
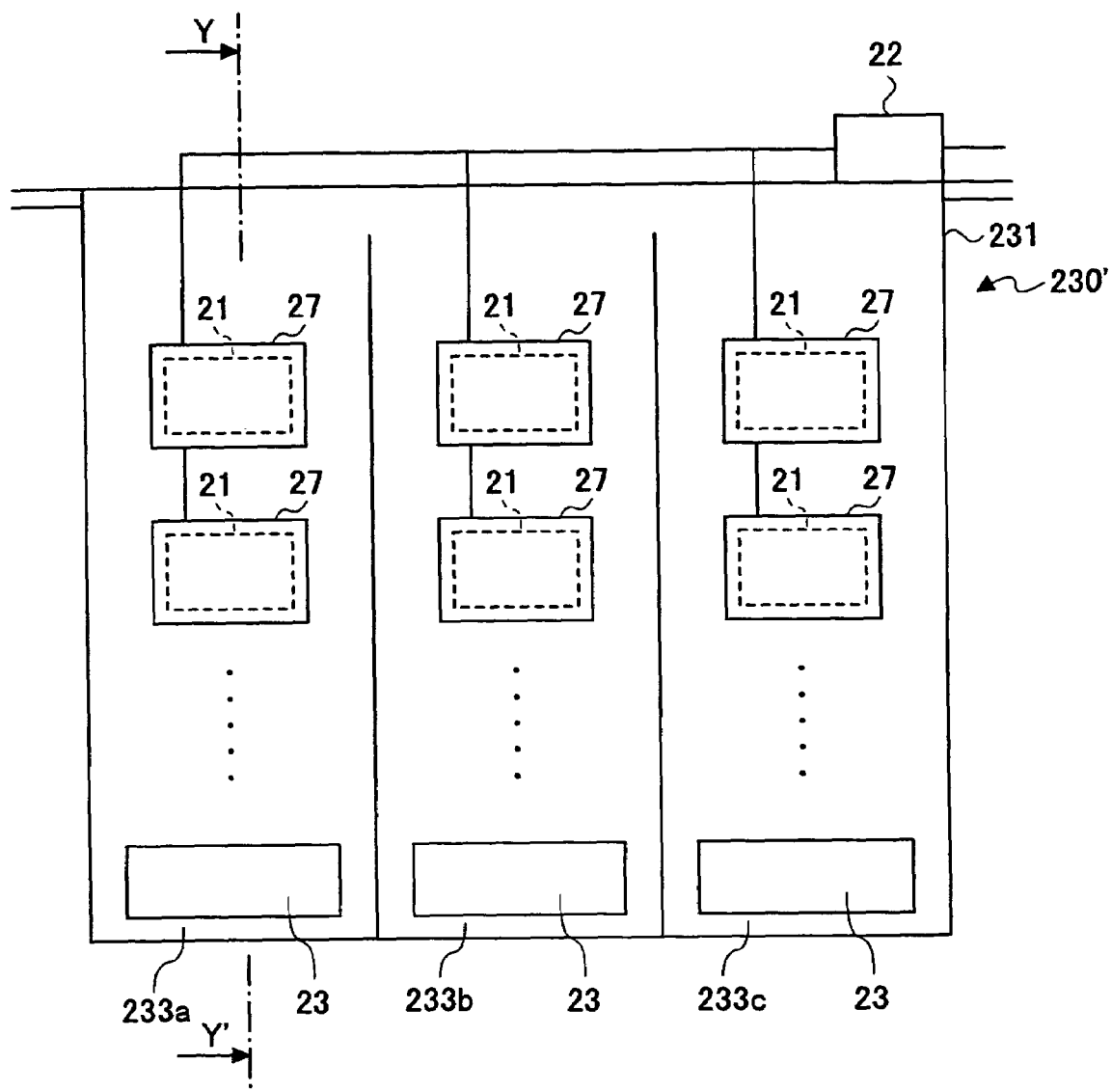
FIG. 27 is a diagram illustrating another configuration of an antenna that may be applied in an embodiment of the present invention.

FIG. 27 is a diagram showing a configuration of an antenna 230' according to another embodiment. It is noted that elements of the antenna 230' shown in FIG. 27 that are identical to those of the antenna 230 shown in FIG. 23 are given the same reference numerals, and their descriptions are omitted. The antenna 230' according to the present embodiment includes a sheet member 231 that is arranged into a flapping-curtain-like structure, communication units 21 that establish communication with an information storage medium via radio waves, a control unit 22 that controls the communication units 21. The sheet member 231 may be made of a flexible plastic sheet, for example, and includes rows 233a through 233c at which the communication units 21 are detachably arranged. Also, weight members 23 are arranged at the bottom sections of the rows 233a through 233c. In the present embodiment, the communication units 21 are each covered by protective members 27, which may be made of packaging air mats, for example.

Figure 28:
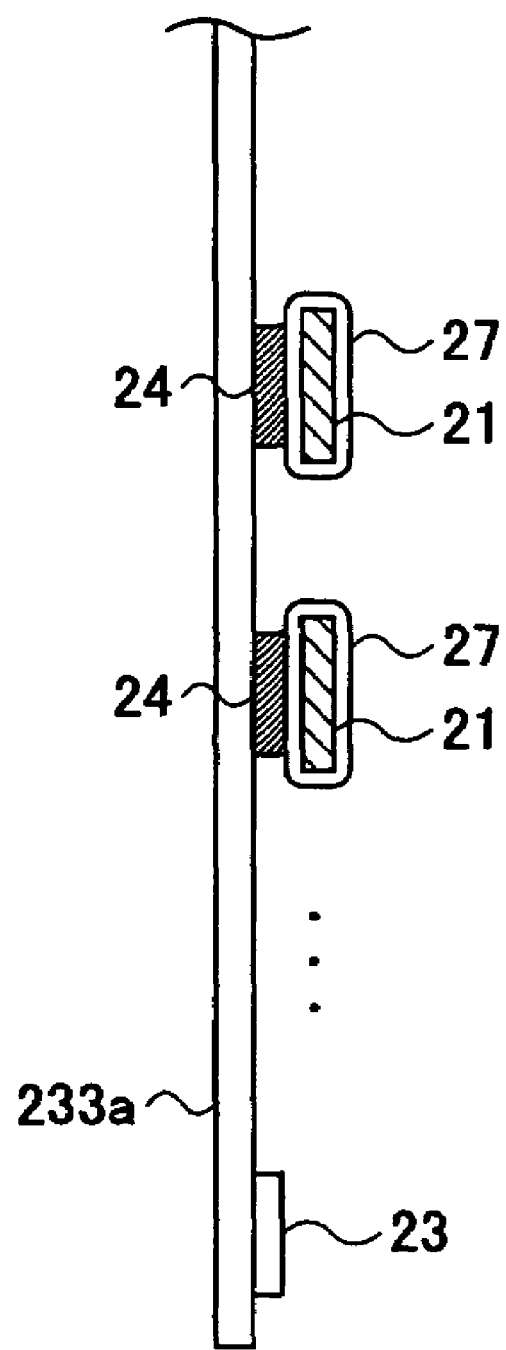
FIG. 28 is a cross-sectional view of the antenna shown in FIG. 27 cut across line Y-Y'.

FIG. 28 is an exemplary cross-sectional view of the antenna 230' shown in FIG. 27 cut across line Y-Y'. In this drawing, the cross-section of the row 233a of the antenna 230' is shown as a representative example; however, it is noted that the other rows 233b and 233c may also have similar cross-sectional structures. In the antenna 230' according to the present example, the communication units 21 that are covered by the protective members 27 are detachably arranged at the row 233a of the sheet member 231, and the weight member 23 is arranged at the bottom section of the row 233a. It is noted that the weight member 23 may be covered by a protective member according to one example. Also, it is noted that in the illustrated example of FIG. 28, the communication units 21 are adjustably fastened to the sheet member 231 by the fastening members 24. As is described above, double sided tape or a hook and loop fastener such as magic tape (registered trademark) may be used as the fastening members 24.

Also, as is the case for the embodiment illustrated in FIG. 23, the object 220 that passes through the antenna 230' of the present embodiment may be protected by a packaging stretch film, for example. In such a case, when the object 220 wrapped up in the stretch film passes through the antenna 230', a blocking effect may occur between the stretch film of the object 220 and the sheet member 231 (plastic sheet); that is, the stretch film and the plastic sheet may be adhered to each other. In order to avoid the occurrence of such an effect, the following measures may be implemented.

(1) Matt processing or $SiO_2$ (silica) filler processing may be performed, for example, in order to arrange the surface of the sheet member 231 into a concavo-convex surface.

(2) The friction coefficient of the surface of the sheet member 231 is arranged to be less than or equal to a predetermined value. For example, silicon coating or fluorine coating may be performed. The friction coefficient of the surface of the sheet member 231 may be set to a value around 0.5 or lower, for example.

(3) The electrical resistance of the surface of the sheet member 231 is arranged to be within a predetermined range. This corresponds to a countermeasure against static electricity, and the surface electrical resistance may be arranged to be within a range of approximately $10^3$~$10^{13}$ Ω/□, for example.

By implementing the anti-blocking measures as is described above, the sheet member 231 and the stretch film covering the object 220 may be prevented from being damaged, and a smooth carry-in process may be realized, for example.

Figure 29:
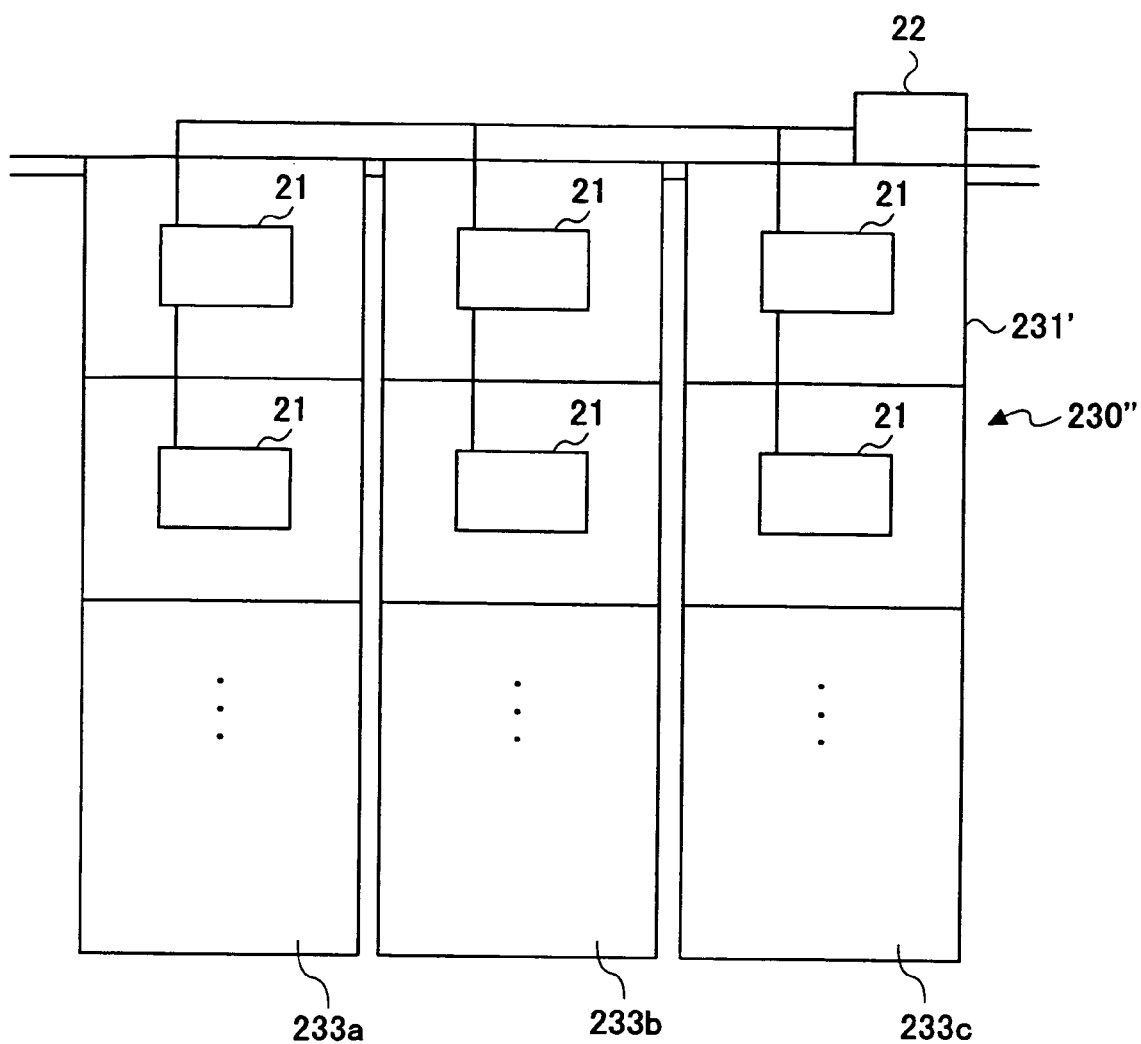
FIG. 29 is a diagram illustrating another configuration of an antenna that may be applied in an embodiment of the present invention.

FIG. 29 is a diagram illustrating a configuration of an antenna 230" according another embodiment. It is noted that elements of the antenna 230" shown in FIG. 29 that are identical to those of the antenna 230 shown in FIG. 23 are given the same reference numerals, and their descriptions are omitted. The antenna 230" according to the present embodiment includes a sheet member 231' that is arranged into a flapping-curtain-like structure, communication units 21 that are configured to establish communication with an information storage medium via radio waves, and a control unit 22 that controls the communication units 21. The sheet member 231' may be made of a flexible plastic sheet, for example, and includes rows 233a through 233c at which the communication units 21 are detachably arranged. It is noted that the communication units 21 may each be covered by protective members in one example.

The antenna 230" according to the present embodiment is made up of plural parts each including at least one communication unit 21. The parts making up the sheet member 231' are bound together by means of elastic members such as springs to realize a polyarticular structure so that the sheet member 231' may be prevented from flapping up. In the present embodiment, after an object 220 passes through the sheet member 231', the antenna 230" is restored back to its original state by means of the elastic members. In other words, in the present embodiment, the flapping of the sheet member 231' is prevented by the elastic members, and thereby, weight members do not have to be arranged at the sheet member 231'.

It is noted that exemplary embodiments of antennas that may be used in reading/writing information from/on an information storage medium (storage unit) for realizing information/guidance management are described above; however, the present invention is not limited to application of such exemplary antennas described above, and other forms of data communication means (transmission/reception means) may be used as well.

Although the present invention is shown and described with respect to certain preferred embodiments, it is obvious that equivalents and modifications will occur to others skilled in the art upon reading and understanding the specification.

The present invention includes all such equivalents and modifications, and is limited only by the scope of the claims.

The present application is based on and claims the benefit of the earlier filing date of Japanese Patent Application No. 2004-286582 filed on Sep. 30, 2004, Japanese Patent Application No. 2004-289025 filed on Sep. 30, 2004, Japanese Patent Application No. 2004-295953 filed on Oct. 8, 2004, and Japanese Patent Application No. 2005-265445 filed on Sep. 13, 2005, the entire contents of which are hereby incorporated by reference.

What is claimed is:

1. An information display medium, comprising:
  a reversible display unit configured to reversibly display first information in visible form and to directly record and display second information, said reversible display unit including a protective layer, a thermo-chromic layer, a base material layer, and back coat layer arranged in order; and
  a reversible display storage unit configured to store content data corresponding to the first information and the second information hand-written on the reversible display unit.

2. An information managing apparatus for managing an information display medium including a reversible display unit that is configured to reversibly display information in visible form and a reversible display storage unit that is configured to store display content data corresponding to the information displayed at the reversible display unit, the apparatus comprising:
  a scanner unit configured to read a display of the reversible display unit and to acquire display read data of the read display;
  a reader unit configured to acquire first display content data stored in the reversible display storage unit; and
  a control unit configured to compare the display read data acquired by the scanner unit and the first display content data acquired by the reader unit, to extract a difference between the display read data and the first display content data based on the comparison, and to output the extracted difference.

3. The information managing apparatus as claimed in claim 2, wherein
  the control unit is configured to perform image recognition on the extracted difference, to generate data corresponding to an image recognition content obtained by the image recognition, and to store second display content data including the generated data in the reversible display storage unit.

4. The information managing apparatus as claimed in claim 3, further comprising:
  a cleaning unit configured to erase the difference, which corresponds to an inscription made on a surface of the information display medium; and
  a printing unit configured to print the image recognition content on the information display medium.

5. The information managing apparatus as claimed in claim 4, wherein
  the printing unit converts the image recognition content into text data and prints the converted image recognition content on the information display medium.

6. The information managing apparatus as claimed in claim 4, wherein
  the printing unit prints the image recognition content as an image.

7. The information managing apparatus as claimed in claim 4, wherein the information managing apparatus is connected to a process managing system, and data pertaining to the printed image recognition content are transmitted to the process managing system.

8. An information managing method for managing an information display medium using an information managing apparatus which information display medium includes a reversible display unit for reversibly displaying information in visible form, and a reversible display storage unit for storing display content data corresponding to the information displayed at the reversible display unit, the method comprising:
  displaying a form including at least one check item at the reversible display unit of the information display medium;
  storing first display content data corresponding to the displayed form in the reversible display storage unit of the information display medium;
  reading a display of the form having a check result inscribed in the check item and acquiring display read data corresponding to the read display;
  acquiring the first display content data from the reversible display storage unit;
  comparing the display read data and the first display content data;
  extracting a difference between the display read data and the first display content data based on the comparison; and
  outputting the extracted difference.

9. The information managing method as claimed in claim 8, further comprising:
  performing image recognition on the extracted difference and generating data corresponding to an image recognition content obtained by the image recognition; and
  storing second display content data including the generated data in the reversible display storage unit of the information display medium.

10. The information managing method as claimed in claim 9, wherein the information managing apparatus includes:
  a cleaning unit configured to erase the difference, which corresponds to an inscription made on the surface of the information display medium; and
  a printing unit configured to print the image recognition content on the information display medium.

11. The information managing method as claimed in claim 10, further comprising:
  converting the image recognition content into text data; and
  printing the converted image recognition content.

12. The information managing method as claimed in claim 10, wherein
  the printing unit prints the image recognition content as an image.

13. A guide managing method for managing guidance for a user using a management computer that is connected to a node terminal stationed at a node, an action schedule storage unit storing action schedule data pertaining to the user, a guidance data storage unit storing guidance data for guiding the user to a next destination node, the node terminal including a reversible print processing unit for performing a reversible print process on a reversible display unit of an information display medium, which includes the reversible display unit for reversibly displaying information in visible form and a data storage unit, and a transmission/reception unit for performing data transmission/reception with the data storage unit of the information display medium, the method including:
  a node determining step for acquiring action determining data stored in the data storage unit of the information display medium via the node terminal, and determining the next destination node for the user based on the acquired action determining data and the action schedule data stored in the action schedule storage unit;

an acquisition step for acquiring the guidance data for guiding the user to the next destination node from the guidance data storage unit; and an outputting step for outputting the acquired guidance data to the information display medium via the node terminal and controlling the reversible display unit of the information display medium to display information corresponding to the acquired guidance data.

14. The guidance managing method as claimed in claim 13, wherein the reversible print processing unit erases information reversibly displayed at the reversible display unit of the information display medium; and controls the reversible display unit to reversibly display the information corresponding to the acquired guidance data.

15. The guidance managing method as claimed in claim 13, wherein the management computer is connected to a user action history data storage unit storing data pertaining to a user level according to an action history of the user;

the guidance data storage unit stores user-level-corresponding guidance data corresponding to the user level;

the data storage unit of the information display medium stores user data identifying the user in possession of the information display medium; and the management computer acquires the user data stored in the data storage unit of the information display medium via the transmission/reception unit of the node terminal, determines the user level of the user based on the user action history data stored in the user action history data storage unit, and acquires the user-level-corresponding guidance data based on the determined user level.

16. The guidance managing method as claimed in claim 13, wherein the action schedule storage unit stores data pertaining to a priority level;

the guidance data storage unit stores priority-level-corresponding guidance data corresponding to the priority level; and the management computer calculates the priority level based on the action determining data acquired via the transmission/reception unit of the node terminal, and acquires the priority-level-corresponding guidance data based on the calculated priority level.

17. A computer-readable medium including computer executable instructions for managing guidance for a user, wherein the instructions are executed on a management computer that is connected to a node terminal stationed at a node, an action schedule storage unit storing action schedule data pertaining to the user, a guidance data storage unit storing guidance data for guiding the user to a next destination node, the node terminal including a reversible print processing unit for performing a reversible print process on a reversible display unit of an information display medium including the reversible display unit for reversibly displaying information in visible form and a data storage unit, and a transmission/reception unit for performing data transmission/reception with the data storage unit of the information display medium, the instructions being executed by the management computer to cause the management computer to perform a method comprising:

a node determining step for acquiring action determining data stored in the data storage unit of the information display medium via the node terminal, and determining the next destination node for the user based on the acquired action determining data and the action schedule data stored in the action schedule storage unit;

an acquisition step for acquiring the guidance data for guiding the user to the next destination node from the guidance data storage unit; and an outputting step for outputting the acquired guidance data to the information display medium via the node terminal and controlling the reversible display unit of the information display medium to display information corresponding to the acquired guidance data.

18. The computer-readable medium as claimed in claim 17, wherein the reversible print processing unit erases information reversibly displayed at the reversible display unit of the information display medium; and controls the reversible display unit to reversibly display the information corresponding to the acquired guidance data.

19. The computer-readable medium as claimed in claim 17, wherein the management computer is connected to a user action history data storage unit storing data pertaining to a user level according to an action history of the user;

the guidance data storage unit stores user-level-corresponding guidance data corresponding to the user level;

the data storage unit of the information display medium stores user data identifying the user in possession of the information display medium; and the management computer acquires the user data stored in the data storage unit of the information display medium via the transmission/reception unit of the node terminal, determines the user level of the user based on the user action history data stored in the user action history data storage unit, and acquires the user-level-corresponding guidance data based on the determined user level.

20. The computer-readable medium as claimed in claim 17, wherein the action schedule storage unit stores data pertaining to a priority level;

the guidance data storage unit stores priority-level-corresponding guidance data corresponding to the priority level; and the management computer calculates the priority level based on the action determining data acquired via the transmission/reception unit of the node terminal, and acquires the priority-level-corresponding guidance data based on the calculated priority level.

* * * * *